United States Patent
Vutukuri et al.

(10) Patent No.: US 11,943,676 B2
(45) Date of Patent: *Mar. 26, 2024

(54) SWITCHING BETWEEN NETWORK BASED AND RELAY BASED OPERATION FOR MISSION CRITICAL VOICE CALL

(71) Applicant: MALIKIE INNOVATIONS LIMITED, Dublin (IE)

(72) Inventors: Eswar Vutukuri, Havant (GB); Takashi Suzuki, Toronto (CA); René Faurie, Versailles (FR)

(73) Assignee: Malikie Innovations Limited, Dublin (IE)

(*) Notice: Subject to any disclaimer, the term of this patent is extended or adjusted under 35 U.S.C. 154(b) by 156 days.

This patent is subject to a terminal disclaimer.

(21) Appl. No.: 17/488,848

(22) Filed: Sep. 29, 2021

(65) Prior Publication Data

US 2022/0038984 A1 Feb. 3, 2022

Related U.S. Application Data

(63) Continuation of application No. 16/723,888, filed on Dec. 20, 2019, now Pat. No. 11,184,828, which is a
(Continued)

(51) Int. Cl.
*H04L 12/28* (2006.01)
*H04W 4/10* (2009.01)
(Continued)

(52) U.S. Cl.
CPC ............. *H04W 36/30* (2013.01); *H04W 4/10* (2013.01); *H04W 40/22* (2013.01); *H04W 88/04* (2013.01)

(58) Field of Classification Search
CPC ....... H04W 8/005; H04W 4/10; H04W 36/30; H04W 40/22; H04W 46/16; H04W 88/04; H04W 36/03
(Continued)

(56) References Cited

U.S. PATENT DOCUMENTS 8,842,633 B2 9/2014 Dwyer et al.
2010/0255845 A1 10/2010 Kitaji
(Continued)

FOREIGN PATENT DOCUMENTS

CN 101742530 A 6/2010
CN 102932859 A 2/2013
(Continued)

OTHER PUBLICATIONS

Extended European Search Report dated Jan. 7, 2022 from EP 21200344.6, pp. 1-12.
(Continued)

*Primary Examiner* — John Pezzlo
(74) *Attorney, Agent, or Firm* — Botos Churchill IP Law LLP

(57) ABSTRACT

A device, serving cell and method of switching between modes of operation for the device in a cellular network comprises receiving a service via a connection with the serving cell. A condition indicative of deterioration in network service and an absence of a suitable neighbor cell are detected. In response, discovery of relay nodes is initiated. When a suitable relay node is discovered, a mechanism to switch to receiving the service via the suitable relay node is initiated. The service may be a mission critical push-to-talk over Long Term Evolution service. The relay node may be user equipment acting as a user equipment-to-network relay node. When the device is in an RCC_CONNECTED state, the mechanism to switch includes sending a relay mode preference indication to the serving cell, receiving a connection release message from the serving cell, releasing the serving cell connection, and establishing a sidelink connection with the relay.

18 Claims, 15 Drawing Sheets

Related U.S. Application Data continuation of application No. 15/564,687, filed as application No. PCT/IB2015/001452 on Apr. 7, 2015, now Pat. No. 10,517,033.

(51) Int. Cl.
*H04W 36/30* (2009.01)
*H04W 40/22* (2009.01)
*H04J 1/16* (2006.01)
*H04W 88/04* (2009.01)

(58) Field of Classification Search
USPC .......................................... 370/252, 329, 386
See application file for complete search history.

(56) References Cited

U.S. PATENT DOCUMENTS

| | | | |
|---|---|---|---|
| 2014/0112162 | A1* | 4/2014 | Tavildar ................ H04W 72/23 370/252 |
| 2016/0204847 | A1 | 7/2016 | Ryu et al. |
| 2016/0286374 | A1 | 9/2016 | Baghel et al. |
| 2016/0295494 | A1* | 10/2016 | Gulati ................. H04W 72/542 |
| 2016/0345142 | A1* | 11/2016 | Kashiwase ............. H04L 67/56 |
| 2017/0078863 | A1* | 3/2017 | Kim ........................ H04L 5/005 |
| 2017/0223752 | A1 | 8/2017 | Jung et al. |
| 2017/0325243 | A1* | 11/2017 | Yasukawa ............ H04L 5/0048 |

FOREIGN PATENT DOCUMENTS

| | | |
|---|---|---|
| CN | 103354653 A | 10/2013 |
| CN | 104144437 A | 11/2014 |
| EP | 2549803 A2 | 1/2013 |
| WO | 2015/004142 A1 | 1/2015 |
| WO | 2015/013049 A1 | 1/2015 |

OTHER PUBLICATIONS

LG Electronics: "Enhancements for Efficient Relaying Operations", 3GPP Draft; R1-133386 Enhancements for Efficient Relaying Operations_LG, 3rd Generation Partnership Project (3GPP), Mobile Competence Centre; 650, Route Des Lucioles; F-06921 Sophia-Antipolis Cedex, vol. RAN WG1, No. Barcelona, Spain; Aug. 19, 2013-Aug. 23, 2013 Aug. 10, 2013 (Aug. 10, 2013), XP050716500, Retrieved from the Internet: URL:http://www.3gpp.org/ftp/tsg_ran/WG1_RL1/TSGR1_74/Docs/ [retrieved on Aug. 10, 2013], pp. 1-5.
International Search Report dated Dec. 16, 2015 from PCT/IB2015/001452, 6 pgs.
ITRI: "Relay for Public Safety ProSe", 3GPP Draft; S2-133501, 3rd Generation Partnership Project (3GPP), vol. SA WG2, No. Xiamen, China; Sep. 23, 2013-Sep. 27, 2013, Sep. 18, 2013 (Sep. 18, 2013), XP050726851, Retrieved from the Internet: URL:http://www.3gpp.org/ftp/tsg sa/WG2 Arch/TSGS2 99 Xiamen/Docs/—[retrieved-on Sep. 18, 2013], 4 pgs.
Examination Report dated Mar. 19, 2019 from EP1577243.7, 10 pgs.
LG Electronics: "Assumptions on Service Continuity based on SA1 LS (S6-150112)", 3GPP Draft; S6-150171 (Revision of 0121 )_Service Continuity_V2, 3rd Generation Partnership Project (3GPP), 650, Route Des Lucioles ; F-06921 Sophia-Antipolis Cedex ; France , vol. SA WG6, Feb. 27, 2015 (Feb. 27, 2015), XP050965135, Retrieved from the Internet: URL:http://www.3gpp.org/ftp/tsg_sa/WG6_MissionCritical/ TSGS6_002_SophiaAntipolis/docs/ [retrieved on Feb. 27, 2015], 4 pgs.
Examination Report dated Mar. 3, 2020 from CN201580080722.5, 7 pgs.
Summons to attend Oral Proceedings dated Jul. 14, 2020 from EP1577243.7, 10 pgs.
Examination Report dated Aug. 27, 2020 from KR10-2017-7032124, 8 pgs.
ITRI: "Relay for Public Safety ProSe", S2-133643, 3GPP TSG SA WG2 #99, 3GPP, (Sep. 26, 2013), 4 pgs.
Examination Report dated Aug. 31, 2020 from CN201580080722.5, 6 pgs.
Oral Proceedings Maintained dated Feb. 11, 2021 from EP1577243.7, 11 pgs.
Alcatel-Lucent et al.: "Discussion on in-coverage, out-of-coverage, and edge-of-cell coverage", 3GPP Draft; R1-141258_D2D_Coverage_Final, 3rd Generation Partnership Project (3GPP), Mobile Competence Centre; France, vol. RAN WG1, No. Shenzhen, China; Mar. 31, 2014—Apr. 4, 2014 Mar. 30, 2014 (Mar. 30, 2014), XP050786931, Retrieved from the Internet: URL:http://www.3gpp.org/ftp/Meetings_3GPP_SYNC/RAN1/Docs/ [retrieved on Mar. 30, 2014], pp. 1-3.
Notice of Allowance dated Feb. 18, 2021 from KR10-2017-7032124, 5 pgs.
Oral Proceedings Cancelled dated Feb. 24, 2021 from EP1577243.7, 1 pg.
Intention to Grant dated Apr. 28, 2021 from EP1577243.7, 8 pgs.
Examination Report dated May 18, 2021 from CA2982813, 3 pgs.
Examination Report dated Sep. 6, 2021 from KR10-2021-7015250, 5 pgs.
Intention to Grant and text intended for grant dated Dec. 16, 2022 received in EP21200344.6, 51 pages.
The First Office Action for Chinese Patent Application No. 202110057269.3, dated Sep. 9, 2023, 7 Pages.
Ericsson , "Seamless Switching of D2D Transmission Modes", 3GPP TSG-RAN WG2 #85bis, Document R2-141261, 2014, pp. 1-4.

* cited by examiner

SWITCHING BETWEEN NETWORK BASED AND RELAY BASED OPERATION FOR MISSION CRITICAL VOICE CALL

CROSS-REFERENCE TO RELATED APPLICATIONS

This is a continuation of U.S. patent application Ser. No. 16/723,888 filed Dec. 20, 2019, which is a continuation of U.S. patent application Ser. No. 15/564,687 filed Oct. 5, 2017, now U.S. Pat. No. 10,517,033, which is a national stage entry of PCT/IB2015/001452 filed Apr. 7, 2015, the entireties of which are incorporated herein by reference.

TECHNICAL FIELD

The present disclosure relates to the use of Proximity-based Services (ProSe) User Equipment-to-Network Relays (UNRs) in the scope of device-to-device communication and more particularly to service continuity for a ProSe-enabled device switching back and forth between a mode of operation by which the device gains access to services directly from the cellular network and a mode of operation by which the device gains access to services through a UNR.

DESCRIPTION OF THE RELATED ART

In general, ProSe capable devices (e.g., devices that support ProSe and Mission Critical Push-To-Talk (MCPTT)) are expected to be mobile. Also network coverage may not be available everywhere. Thus, User Equipment (UE) (e.g., mobile devices such as cellular phones, tablets, laptop computers, etc.) move in and out of network coverage. When in coverage of the network, a UE can receive the services provided by the network in the Network Mode Operation (NMO), wherein the network directly provides the services such as MCPTT over Long Term Evolution (LTE) service to MCPTT UEs that are within radio coverage of an evolved node B (eNB) (i.e. an LTE base station). Whilst out of coverage of the network, a ProSe UE within coverage of a UE-to-Network Relay (UNR), a node relaying the services from the network to other UEs, relies on this UNR for maintaining access to the MCPTT services and may enter Network Mode Operation via Relay (NMO-R) for this purpose.

In some instances, a UE may experience a service interruption and unacceptable latency (e.g., for the Public Safety services) when moving from a location where there is network coverage (NMO) to a location where there is no network coverage whilst in coverage of a UNR (i.e. with NMO-R opportunity). Specifically, the interaction between the eNB and the UE or the eNB and the UNR in order to facilitate this switch between NMO and NMO-R has not been specified in detail and it remains open how these mechanisms will be achieved at the radio level.

As an example, subsequent to the disconnection from an LTE network due to a Radio Link Failure (RLF) and before the UE would recover service through a relay, there may be a significant service interruption delay. This delay is in the order of 0.5 to 18 sec and such a delay may be a problem for most of the mission critical services which are being targeted by 3rd Generation Partnership Project (3GPP).

Similar to the above situation, a UE operating in NMO-R may need to transition from NMO-R to NMO without a large service interruption time. For example, remaining connected via a UNR, when network coverage is available may result in excessive battery consumption by the UNR and reduced quality of service. It is also generally accepted that UE behavior be predictable and deterministic in such scenarios.

Existing seamless mobility provided by handover mechanisms are unsuitable/inappropriate because the serving cell may not be aware of the existence of a suitable relay, and/or may not be able to initiate a handover preparation phase with the relay. Connected mode mobility to Closed Subscriber Group (CSG) cells relies on UE-based discovery and network-based preparation phase followed by a handover, which is not possible because handover of a UE to a UNR is not feasible. Autonomous reselection while in connected mode, while permitted in Universal Mobile Telecommunications System (UMTS), Global System for Mobile Communications (GSM) and General Packet Radio Service (GPRS) (i.e. in packet transfer mode), is not allowed in LTE. In any case, mechanisms using the existing neighbor cell discovery cannot be used for autonomous reselection to UNR because these will result in higher power consumption.

BRIEF DESCRIPTION OF THE DRAWINGS

The accompanying drawings, which are incorporated in and constitute part of this specification, illustrate embodiments of the present disclosure and together with the description, serve to explain the principles of the disclosure. The embodiments illustrated herein are for example purposes only and not limited to the precise arrangements and instrumentalities shown, wherein.

DETAILED DESCRIPTION

Figure 1:
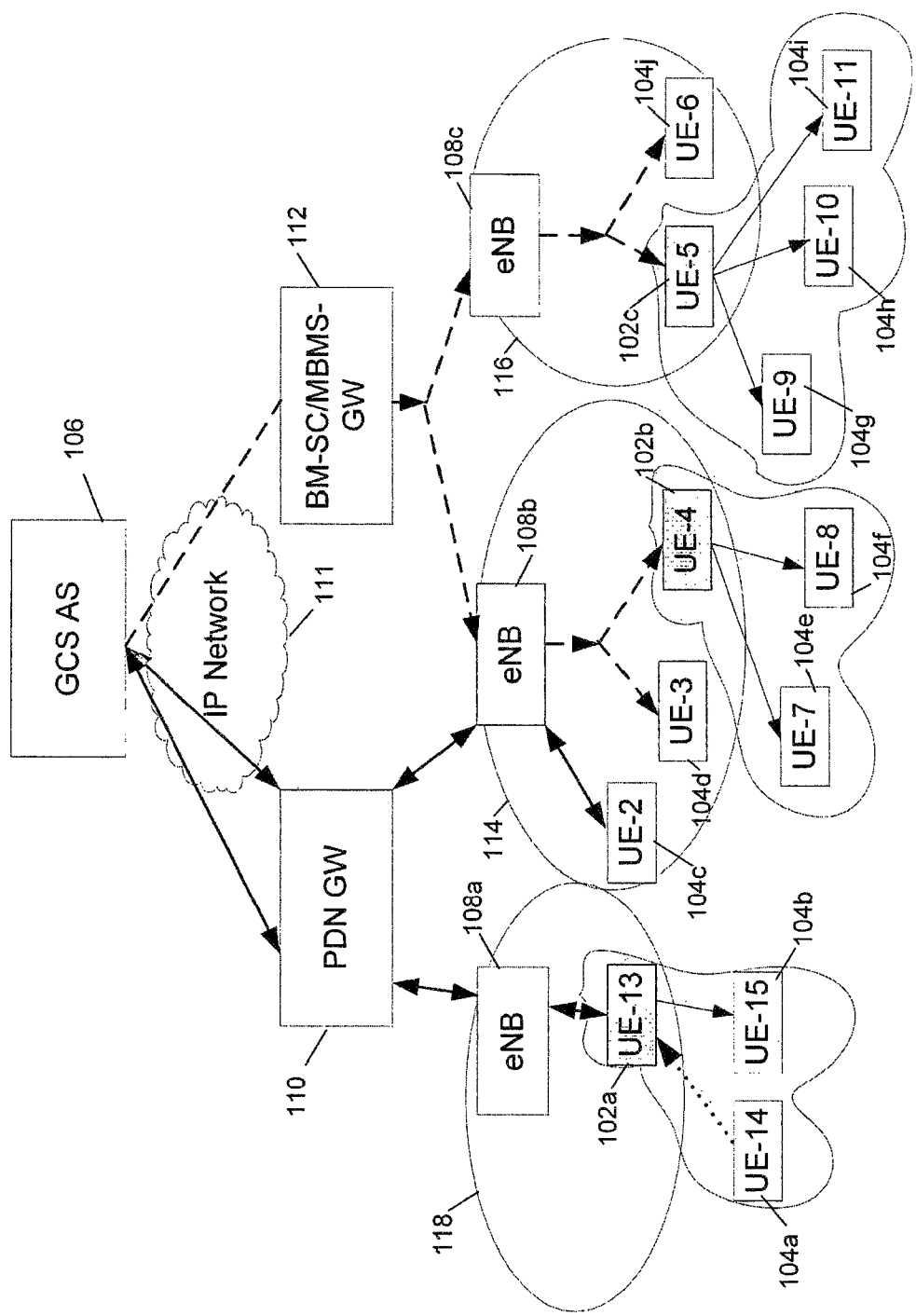
FIG. 1 is a block diagram of an example system for providing coverage extension using ProSe User-to-Network Relays (UNRs) in accordance with one aspect of the present disclosure.

Embodiments provide for a device, serving cell and method of switching between modes of operation for the device in a cellular network. In accordance with one aspect of the present disclosure, a method is provided for switching between modes of operation for a device in a cellular network. A service is received via a connection with a serving cell. While receiving the service via the connection with the serving cell, a condition indicative of a deterioration in the service received via the connection with the serving cell and an absence of a suitable neighbor cell are detected. Responsive to detecting both the condition indicative of a deterioration in the service received via the connection with the serving cell and the absence of a suitable neighbor cell, discovery of relay nodes is initiated.

In accordance with another aspect of the present disclosure, a device operating in a cellular network includes a communication subsystem that receives a service via a connection with a serving cell a processor. The processor is communicatively coupled with the communication subsystem. While the at least one communication subsystem is receiving the service via the connection with the serving cell, the processor detects a condition indicative of a deterioration in the service received via the connection with the serving cell and an absence of a suitable neighbor cell. Responsive to detecting both the condition indicative of a deterioration in the service received via the connection with the serving cell and the absence of a suitable neighbor cell, the processor initiates discovery of relay nodes.

In accordance with another aspect, a computer program product for enabling switching between modes of operation for a device in a cellular network is provided. The computer program product includes a non-transitory computer readable storage medium having computer readable program code embodied therewith. The computer readable program code contains instructions for providing a service to the device and determining, while providing the service to the device, that the device is approaching an edge of coverage. The computer readable program code contains further instructions for, responsive to determining that the device is approaching the edge of coverage, sending a relay discovery command to the device; receiving a measurement report from the device indicating discovered nodes capable of acting as relay nodes; selecting a suitable node to act as a relay node; and instructing the device to initiate a mechanism to switch to receiving the service via the relay node.

According to another aspect, a serving cell is provided for enabling switching between modes of operation for a device operating in a cellular network. The serving cell includes a processor and a communication subsystem. The communication subsystem is communicatively coupled with the processor. The communication subsystem provides a service to the device, and responsive to the processor determining that the device is approaching an edge of coverage: sends a relay discovery command to the device and receives a measurement report from the device indicating discovered nodes capable of acting as relay nodes. While the communication subsystem is providing the service to the device, the processor determines that the device is approaching an edge of coverage. Responsive to receiving the measurement report from the device, the processor selects a suitable node to act as a relay node and instructs the device to initiate a mechanism to switch to receiving the service via the relay node.

It should be noted that although the examples provided herein relate to 3GPP and LTE, the proposed solutions are not limited to those examples and may be applicable to other systems or Radio Access Technologies, such as (but not limited to) 3GPP GSM EDGE Radio Access Network (3GPP GERAN) or 3GPP UMTS Terrestrial Radio Access Network (3GPP UTRAN), IEEE 802.11, CDMA2000, etc.

In addition, the names used for code-points, information elements and messages are only examples, and other names may be used. Furthermore, although the description of the solution might refer to a specific application (e.g. MCPTT), the solutions presented here are not limited in applicability to any particular application. Additionally, the terms "UNR," "relay" and "relay node" are used interchangeably herein.

Referring now to FIG. 1, User-to-Network Relays (UNRs) may be used for extending network coverage for Mission Critical Push-To-Talk (MCPTT). UE-13, UE-4, and UE-5 are acting as UNRs 102a, 102b, 102c (referenced generally or collectively as UNR 102). A UNR 102 communicates with eNB 108 of the LTE network 100 through the LTE-Uu (Uu) radio interface and is able to connect a remote User Equipment (UE) 104a-104j (referenced generally or collectively as UE 104) that is outside radio network coverage to the LTE network 100. The UNR 102 then relays downlink (network-to-UE) and uplink (UE-to-network) transmissions over the ProSe UE-to-UE Sidelink radio interface (PC5).

As illustrated, the network may use multicast (e.g., Multimedia Broadcast Multicast Service (MBMS)) or unicast (Evolved Packet System (EPS) bearers) transmission types. In this example, the Group Communication Service Application Server (GCS AS) 106 is the MCPTT application server. Multicast service is provided as enhanced MBMS (eMBMS) via Broadcast-Multicast Service Center/MBMS (BM-SC/MBMS) gateway 112. eMBMS transmission links between the GAS AS 106 and the LTE UE 104, referred to as the LTE-Uu (Uu) are denoted as thick dashed lines. Unicast transmission links are provided via the Packet Data Network (PDN) gateway 110 and are denoted as thick solid lines. GCS AS 106 communicates with BM-SC/MBMS gateway 112 and PDN gateway 110 via an Internet Provider (IP) Network 111.

The network 100 can directly provide the MCPTT service to MCPTT UEs that are within radio coverage of an eNB 108a, 108b, 108c (referenced generally or collectively as eNB 108) in Network Mode Operation (NMO) mode. In FIG. 1, UE-2 104c, UE-3 104d and UE-6 104j are operating in NMO. UE-2 104c, UE-3 104d and UE-4 (UNR 102b) are within broadcast range 114 of eNB 108b.

On the other hand, out of coverage UEs 104 may receive the MCPTT service via UNRs 102 in a mode referred to as Network Mode Operation via Relay (NMO-R). In FIG. 1, UE-14 104a and UE-15 104b are operating in NMO-R through UE-13 (UNR 102a), UE-7 104e and UE-8 104f are operating in NMO-R through UE-4 (UNR 102b), while UE-9 104g, UE-10 104h and UE-11 104i are operating in NMO-R through UE-5 (UNR 102c). In FIG. 1, UNR downlinks relaying over PC5 are denoted as thin solid lines.

In addition, UE-14 104a is in use by the current talker of the MCPTT group, and UE-13 (UNR 102a) is the UNR in charge of transferring talker's voice to the eNB 108a and eventually to the GCS/MCPTT application server 106. UNR uplink relaying over PC5 is denoted as a thin dotted line.

It should be noted that both end-user Public Safety (e.g., MCPTT) service provision and UE-to-Network relaying functions may be activated on a single UE. However, for the sake of clarity, these functions are further considered as independent functionalities. It should also be noted that both the application media stream (e.g., voice frames) and the corresponding signaling (e.g., Session Initiation Protocol (SIP) signaling messages) are relayed to/from out-of-coverage UEs (this infers that a listening-only UE may use uplink transmission in certain phases of a group call).

NMO to NMO-R Switch

For a UE receiving MCPTT service from the network in NMO, transitioning to NMO-R largely comprises two distinct phases:
 a) discovering suitable UNR; and
 b) executing a procedure to move the NMO bearers over Uu to NMO-R bearers over PC5.

Figure 2:
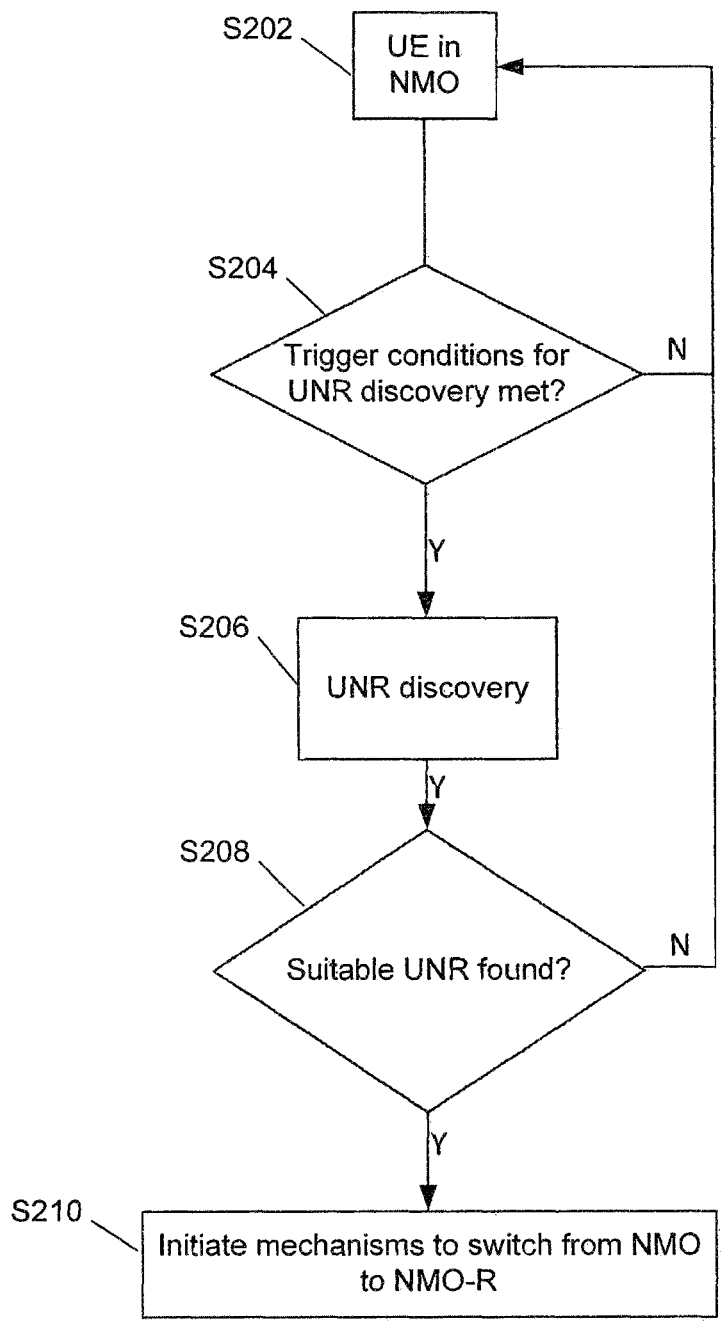
FIG. 2 is a flow chart illustrating an example process for triggering the switch of a User Equipment (UE) operating in Network Mode Operation (NMO) to Network Mode Operation via Relay (NMO-R) in accordance with one aspect of the present disclosure.

Referring now to FIG. 2, a flowchart 200 is provided which illustrates an example process for switching a UE 104 from operating in NMO mode to operating in NMO-R mode. It should be noted, in the following descriptions, that the term "network" is used to indicate the infrastructure element to which the device (either UE 104 or UNR 102 depending on the context) is receiving the service from. Typically, this infrastructure element will be an LTE eNB 108.

Beginning at block S202, the UE 104, operating NMO mode, upon satisfying (at block S204) the triggering conditions for discovering UNRs 102, initiates (at block S206) UNR discovery. UNR discovery may be triggered by either the UE 104 or the network, and methods of triggering discovery by both the UE 104 and the network are discussed in further detail below. The UE 104 starts to attempt UNR discovery based on the deterioration of serving cell quality/signal strength and the absence of suitable neighbor (i.e. non-UNR) cells (i.e. edge of radio network coverage). The network may trigger UNR discovery based on, for example, failed handover attempt (target cell overloaded, etc.). If whilst discovering a UNR, the quality of the service received via the network improves or if a suitable target neighbor cell is found (thus providing a way for the UE to continue the NMO), the UE may stop the UNR discovery procedures and stay in NMO (i.e. return to block S202). Upon satisfying (at block S208) the discovery and selection of a suitable UNR 102, the UE 104 then initiates (at block S210) mechanisms to switch to NMO-R at an appropriate time.

Figure 3:
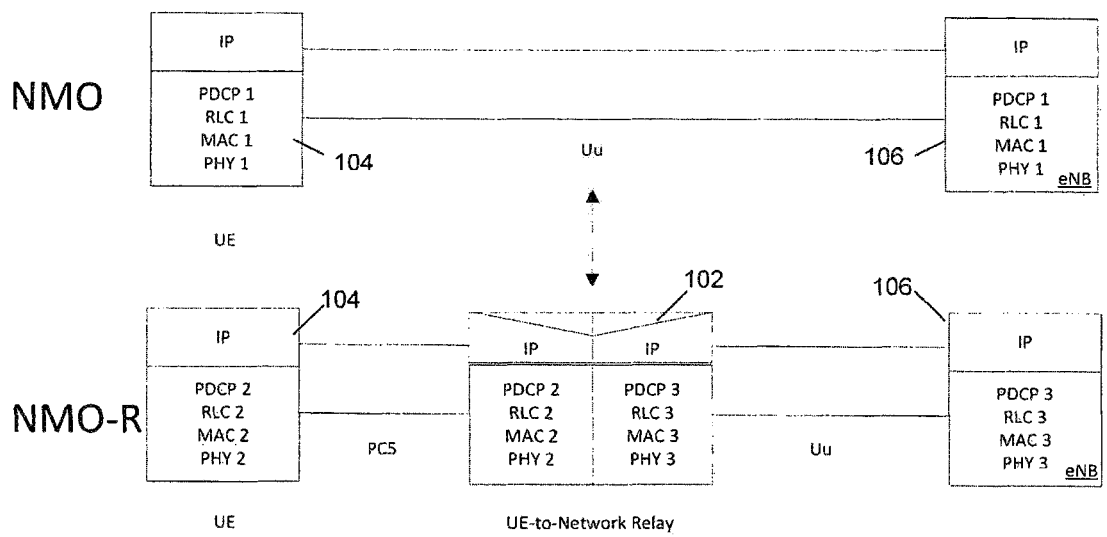
FIG. 3 is a block diagram illustrating an association of various peer protocol layers in NMO and NMO-R.

When the UE 104 is in NMO, it is receiving service via the network. The application (e.g., the MCPTT application) should be oblivious to any changes in the lower layer when the UE 104 switches to NMO-R. The PDCP, RLC, MAC and PHY layers in the LTE stack however need to be reconfigured into NMO-R mode of operation upon moving into NMO-R. The association of various peer protocol layers in NMO and NMO-R are as shown in FIG. 3.

Triggering Conditions for Initiating Discovery of UNR

The detection of trigger conditions for switching from NMO to NMO-R switch, in turn, initiates the discovery of suitable UNRs 102. An example sequence may be measuring serving cell, measuring neighbor cell (NC), determining that the serving cell is low and there is no suitable NC, looking for UNRs 102 (i.e. performing discovery), and eventually switching to NMO-R upon finding a suitable UNR 102. The UE 104 may indicate to the network its preference to the network (or that certain criteria are met) to switch to NMO-R, with or without identifying a candidate UNR 102 during this process. In RRC_CONNECTED mode, this preference may indicate a request for the network to terminate the RRC connection.

Certain devices having more than one transceiver may be capable of performing a "Make-Before-Break" (MBB) handover, which is discussed in greater detail below. For both MBB-capable and non-MBB-capable devices, discovery may be initiated prior to RRC Connection Release in the serving cell.

A UE 104 may discover one or more relays 102 supporting the MCPTT service (i.e. phase a) of NMO to NMO-R transition, mentioned above) the UE 104 is interested in to be able to switch to NMO-R operation (i.e. phase b) of NMO to NMO-R transition, mentioned above). However, searching for relays 102 in the vicinity of UE 104 incurs additional power consumption at the UE 104. Performing discovery whilst being in NMO may also result in service interruption or degradation to the services received over the network depending on the UE 104 capabilities.

Hence, a UE 104 in RRC_IDLE or RRC_CONNECTED with good radio conditions and using the MCPTT service in NMO with a satisfactory quality of service may not trigger UNR discovery. In principle, if the UE 104 finds a suitable neighbor cell when the serving cell quality degrades, then the UE 104 follows the normal procedures and reports target cell measurements to the eNB 108 (i.e. using measurement report) and depends on the eNB 108 for potential service continuity (e.g., handover (HO), as is the case currently in RRC_CONNECTED mode).

However, if the eNB 108, upon receiving the measurement report, makes a decision that handover is not suitable and instead NMO-R might be necessary (e.g., due to a high load in the reported neighbor cell, reported quality being not good enough, etc.), the eNB 108 may trigger the UE 104 to initiate discovery of the relays 102 at the UE 104.

Additionally, a UE 104 in NMO may autonomously initiate UNR discovery upon determining certain conditions calling for an imminent need for transition to NMO-R. In such a case, the UE 104 shall initiate and complete the UNR discovery before the UE 104 is abruptly disconnected from the network (e.g., by experiencing a Radio Link Failure). The triggering conditions for beginning the search for UNRs 102 may include one or more of.

Detection of a condition indicating degrading network service; and

Detection of "Edge of coverage" condition.

One example of a condition indicating degrading network service is the detection of radio link degradation on the Uu interface. This degradation may include degradation of serving cell quality (e.g., Radio Signal Receive Quality (RSRQ) or Channel Quality Indicator (CQI)) below a predetermined threshold. Such a predetermined threshold may be signaled to the UE 104 via RRC signaling or may be preconfigured in the UE (e.g., specified in the standards, configured in the Universal Integrated Circuit Card (UICC), etc.).

Anticipation of an imminent Radio Link Failure (RLF) is another example of a condition indicating degrading network service. Radio link monitoring is used to detect the quality of radio link between the eNB 108 and the UE 104. The RLF procedure is used to trigger procedures that the UE 104 shall initiate upon detecting deterioration of the radio link between the eNB 108 and the UE 104. Two phases govern the behavior associated to RLF. The first phase is started upon radio problem detection (i.e. upon detecting a predetermined number of out-of-sync indications from physical layer) and leads to RLF detection. The UE 104 continues to be in RRC_CONNECTED state and is based on timer or other (e.g., counting) criteria ($T_1$). The timer is referred to as T310 in 3GPP TS 36.331. The second phase is started upon RLF detection (i.e. subsequent to first phase) or handover failure and is also timer based ($T_2$) (i.e. a timer (referred to as T311 in 3GPP TS 36.331) is started upon detecting the RLF. During phase two, the UE 104 initiates a reestablishment procedure and attempts to reconnect to an eNB 108. Upon expiry of the timer (T311), the UE 104 enters RRC_IDLE. Anticipation of RLF may include one or more of a timer indicative of imminent radio link failure (such as T310 or T312) is running or a predetermined number of "out-of-sync" indications have been received. The predetermined number of out-of-sync indications may be indicated to the UE 104 via RRC signaling or may be preconfigured in the UE 104 (e.g., specified in the standards, configured in the UICC, etc.).

Another example of a condition indicating degrading network service is service quality degradation. The application or an underlying protocol such as Packet Data Convergence Protocol (PDCP) or Radio Link Control (RLC) detects that the quality of the received service has degraded below a predetermined threshold. For instance, this detection may include detection of a predetermined number or percentage of missed/un-decoded voice frames, user data frames or IP packets pertaining to a media. This detection may also include determination that other key parameters, such as the residual bit error rate on the application packets, has exceeded a predetermined threshold, etc. These predetermined numbers and thresholds may either be signaled to the UE 104 via RRC signaling or they may be preconfigured in the UE 104 (e.g. specified in the standards, configured in the UICC, etc.).

Yet another example of a condition indicating degrading network service is the service becoming unavailable. In other words, the serving cell does not provide the service (e.g., the MCPTT session or the eMBMS session) the UE 104 is interested in (e.g., due to temporary lack or resources).

An example of detection of "Edge of coverage" condition may include detection of one or more of the above conditions related to degrading network service in the serving cell whilst determining that there is no suitable neighbor cell providing the service by which the UE 104 is interested in. Edge of coverage may be detected based on the neighbor cell measurements and also via the system information of the neighbor cells to identify if the service is supported, for example, by reading the System Information Block (SIB) 13 to see if the related service (e.g., MCPTT service or the eMBMS session, etc.) is available.

When a UE 104 is approaching the edge of coverage, none of the detected cells including the serving cells and neighbor cells on the measured frequencies, would look good (i.e. there is no suitable cell as defined in 3GPP TS 36.304). For example, the received power of those cells may be less than a threshold. If that is the case and the UE 104 has not triggered any events for handover (for example, Event A3 as defined in 3GPP TS 36.331), then NMO-R may be appropriate.

According to 3GPP TS 36.331, Event A2 is triggered if the serving frequency signal becomes worse than a threshold. However, if the measurement report does not contain any neighbor cell measurement, it may be indicative of the Edge of coverage condition. Moreover, there is no event for reporting that non-serving cells become worse than a threshold. A new event, e.g., A7, may be defined and will be triggered when a non-serving frequency becomes worse than a threshold. When the network receives both A2 and A7 triggers, the network may assume that the UE 104 is approaching the edge of the coverage.

Note that some or all of the above triggering conditions may be detected by either the UE 104 or the eNB 108 or both. Upon satisfying the triggering conditions for initiating discovery of UNR 102, the UE 104 shall proceed to phase b) of the procedure for transitioning to NMO-R (i.e. the UE 104 shall initiate the UNR discovery procedure).

UE Triggered Mechanisms to Switch to NMO-R

Once the UE 104 initiates NMO to NMO-R switching mechanism (i.e. the phase b) of the transitioning to NMO-R), depending on the RRC state of the UE 104 in NMO, the UE 104 may need to execute different mechanisms to eventually complete the NMO to NMO-R switch. Details of the switching mechanisms depending on the UE's RRC state are also discussed in further detail below.

UE in RRC_CONNECTED State

Two approaches for switching from NMO to NMO-R for a UE 104 in RRC_CONNECTED state are disclosed: Break-Before-Make (BBM) and Make-Before-Break (MBB). In BBM, the MCPTT service is re-established through the UNR 102 over the PC5 interface after the RRC connection has been released and accesses the MCPTT services through the eNB 108 over the Uu interface is interrupted. Using MBB, the MCPTT service is handed over from the eNB/Uu path to the relay/PC5 path before the RRC connection is released and related access to MCPTT services is uninterrupted. Depending on the UE 104 capability (i.e. on whether the UE 104 supports simultaneously PC5 bearers and Uu bearers) and criticality of the MCPTT service, a choice between MBB and BBM procedures is made. This decision can be made by the UE 104 and signaled to the network, or the decision can be made at the network (e.g., based on the information provided by the UE 104).

Figure 4:
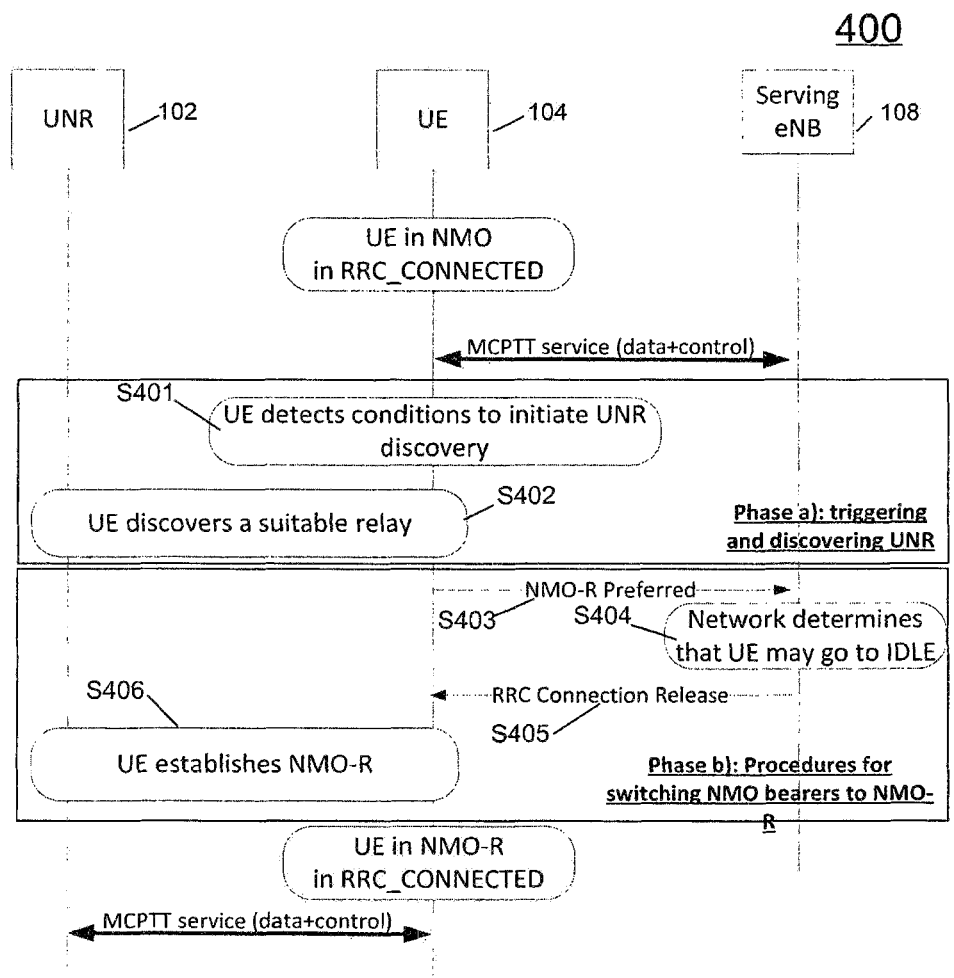
FIG. 4 is an example event flow diagram illustrating a user equipment-triggered process by which a UE operating in NMO in the RRC_CONNECTED state is switched to NMO-R using a Break-Before-Make (BBM) approach according to an aspect of the present disclosure.

"Break-Before-Make" (BBM):

Using this first approach, depicted by event flow diagram 400 in FIG. 4, the UE 104 is operating in NMO in the RRC_CONNECTED state. MCPTT service (i.e. data and control) is provided directly from the serving eNB 108 to the UE 104 over the Uu radio link. At step S401, the UE 104 detects that a condition to initiate UNR discovery exists.

The UE 104, at step S402, performs the ProSe Direct Discovery of UNRs 102 in communication range able to provide connectivity for the service the UE 104 is interested in and selects an appropriate relay 102. ProSe Direct Discovery consists of a set of procedures used by ProSe enabled UEs or ProSe relays supporting Direct Discovery to detect and identify other ProSe-enabled UE(s) or ProSe relay(s) in their proximity, using E-UTRA direct radio signals via PC5. It should be noted that EPC-level Discovery (by which the Enhanced Packet Core determines the proximity of the UEs and informs them of their respective proximity) should be distinguished from ProSe Direct Discovery. 3GPP TS 23.303 specifies two discovery models, Model A and Model B.

Model A ("I am here") defines two roles for the ProSe-enabled UEs/ProSe relays that are participating in ProSe Direct Discovery: the Announcing UE announces certain information that could be used by UEs in proximity that have permission to discover and the Monitoring UE monitors certain information of interest in proximity of announcing UEs. In this model, the announcing UE broadcasts discovery messages at pre-defined discovery intervals and the monitoring UEs that are interested in these messages read and process these messages.

Model B ("who is there?"/"are you there?") defines two different roles for the ProSe-enabled UEs/ProSe relays that are participating in ProSe Direct Discovery: the Discoverer UE transmits a request containing certain information about what it is interested to discover and the Discoveree UE receives the request message and can respond with some information related to the discoverer's request.

The following information may be used for ProSe UNR discovery and selection:
  Message type identifier (e.g., identifying Model A or Model B discovery);
  ProSe Relay (UE) ID: link layer identifier that is used for direct communication and is associated with a PDN connection the ProSe UNR has established;
  PLMN ID: identifies the Public Land Mobile Network (PLMN) to which radio frequencies used on the link to the Remote UE belong. If these radio frequencies are shared between multiple PLMNs, or not allocated to any PLMN, then the choice of PLMN ID is configured by the Home PLMN (HPLMN);
  ProSe Application Relay Code: parameter identifying connectivity the ProSe UNR provides (e.g., including Access Point Name (APN) information);
  Whether the discovered UE can act as a relay (i.e. whether a UE that has been discovered can act as an UNR); and
  Status/maintenance flags (e.g., indicating whether the relay is temporarily without connectivity or battery running low so the Remote UEs can seek/reselect another Relay).

Returning now to FIG. 4, in order to enable the exit from NMO, the UE 104 sends, at step S403, a NMO-R Preferred (i.e. a relay mode preference) indication to the network. This indication may, implicitly or explicitly, express a request for releasing the RRC connection. For example, the release of the RRC connection may be performed for a device not supporting concurrent transmission on Uu and PC5, hence unable to switch to NMO-R in RRC_CONNECTED, while this is not performed for a device capable of simultaneous transmission on Uu and PC5. On receipt of the NMO-R Preferred indication, at step S404, the network may determine that the RRC connection should be released.

If the network determines, at step S404, that the RRC connection should be released, the network sends, at step S405, a RRC Connection Release message to the UE 104. A new release cause value is set in the RRC Connection Release message in order to indicate to the UE to not trigger service request procedure and keep the existing EPS bearers.

Optionally, the network may also include, in the RRC Connection Release message, identities of any other target relays 102 that the network may deem appropriate. The network will know the approximate location of the UE 104 and may for instance be aware of UNRs 102 operating in the proximity of the UE 104 and indicate the UNRs' 102 identities for the UE 104 to discover. The UE 104 may use these UNR identities to perform a subsequent discovery step to find if a more suitable UNR 102 may be found. These identities may be included in the RRC Release message or sent separately from the release message.

Upon releasing the RRC connection, the eNB 108 may also initiate S1 bearer release for the UE 104. Alternatively, the eNB 108 may keep the corresponding S1 bearers and redirect the user plane traffic to the UNR 102. The network may choose to release the UE context at this point although the UE 104 keeps the context of the PDN connection locally. The steps described below are independent of how the traffic is rerouted to the UNR 102 and whether or not the network releases the UE context. In other words, the subsequent steps are independent of whether the UE 104 may be considered as attached or detached as far as network is concerned. If the network does not release the RRC connection, the UE 104 remains in NMO and does not initiate the switch to NMO-R, until/unless a RLF is experienced and the UE 104 loses network Uu connectivity.

Figure 5:
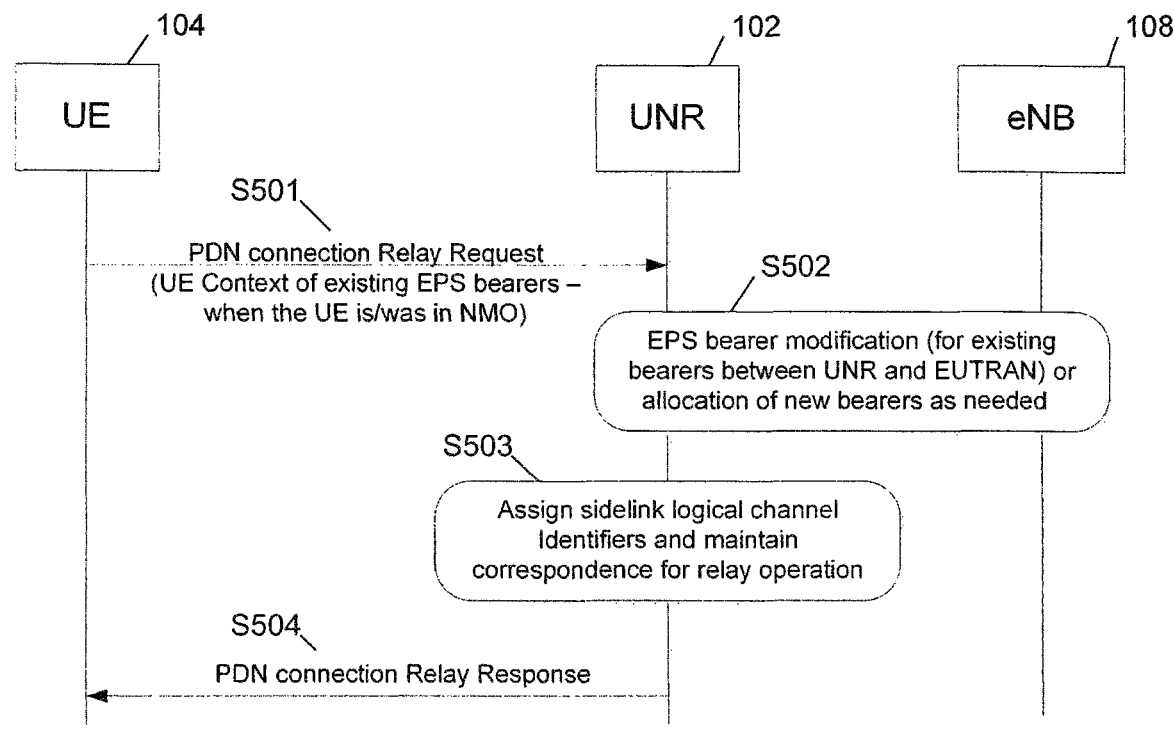
FIG. 5 is an example event flow diagram illustrating a process for transitioning NMO logical channels to NMO-R according to an aspect of the present disclosure.

The UE 104 performs, at step S406, procedures described in FIGS. 5 and/or 7 to switch to NMO-R, depending upon whether or not the UE 104 is currently in an established MCPTT session.

During one-to-one connection establishment, the UE 104 may request the UNR 102 to relay the existing PDN connection(s), as shown in FIG. 5. The UE 104 establishes a one-to-one connection with a UNR 102 capable of relaying the PDN connection(s) for the services to be carried over PC5 interface and requests, at step S501, the UNR 102 to relay this (these) PDN connection(s). This request can be complemented by relevant UE context information to the UNR 102. The relevant UE context information may indicate the PDN connection(s) and the related APNs. The UE context may also include the Quality of Service (QoS) and other parameters related to the EPS bearers used by the UE 104 while in NMO.

The UNR 102 requests, at step S502, bearer resource modification or allocation from the network based on the information received from the UE in step S501 by transmitting Bearer Resource Allocation Request or Bearer Resource Modification Request to the network. In return the network may modify the already established EPS bearers between UNR 102 and eNB 108 (e.g., bearers serving UNR's 102 own communication needs or bearers for relaying transmissions for other out of coverage UEs 104) or allocate new dedicated EPS bearers. This step ensures that the Uu link between the UNR 102 and the eNB 108 can efficiently serve the out of coverage UE 104.

The UNR 102 assigns, at step S503, logical channel identities of PC5 bearers corresponding to the EPS bearers to be relayed. The UNR 102 maintains the following information per EPS bearer to be relayed for relaying operation over PC5.
  a. L2 source address of the UE 104;
  b. IP address of the UE 104 assigned by the UNR 102;
  c. Identity of the EPS bearer(s) that the UE 104 requested;
  d. Identity of the UNR's EPS bearer which is now associated with the EPS bearer identity the UE 104 requested (i.e. transporting the corresponding data); and e. Sidelink logical channel identity assigned to the EPS bearer in c and d.

At step S504, the UNR 102 responds to the UE 104 with the sidelink logical channel identities corresponding to EPS bearers. The UE 104 establishes the PC5 bearers and associates the logical channel identities with the corresponding EPS bearers.

Further variants of the BBM approach presented above can be considered, such as, upon reception of the NMO-R Preferred indication in step S403, the network may elect to send a newly defined indication Switch to NMO-R Deferred instead of the RCC Connection Release in step S405, as a result of which the UE 104 remains in NMO and does not initiate the step S406, until/unless a RLF is experienced.

As a further alternative, instead of sending a Switch to NMO-R Deferred indication, the network may send the ProSe configuration applicable in the cell to the UE 104 to enable NMO-R operation. This option is applicable when the ProSe frequency belongs to the serving cell. This option assumes that the UNR 102 is also using the same ProSe configuration (e.g., since the UNR 102 is connected to the same eNB 108 or to an eNB 108 whose ProSe configuration is known to the serving eNB).

Additionally, the UE 104 starts a timer at the sending of the NMO-R Preferred indication to the network at step S403. If the timer elapses before the UE 104 receives a RRC Connection Release or a Switch to NMO-R Deferred (variant mentioned above), the UE 104 initiates step S406 if capabilities allow.

Sending the NMO-R Preferred indication to the network may be left optional. By default, if the UE 104 switches to NMO-R without transmitting this indication, the eNB 108 may send the UE 104 to RRC_IDLE due to inactivity.

"Make-Before-Break" (MBB):

In the MBB approach, the UE 104 performs discovery of suitable relay(s), may interact with the network before proceeding to NMO-R establishment, then switches to NMO-R. This approach minimizes the service interruption time incurred during the establishment of NMO-R as the UE 104 supports discovery of UNRs 102 and establishment of NMO-R whilst in RRC_CONNECTED state.

Figure 6:
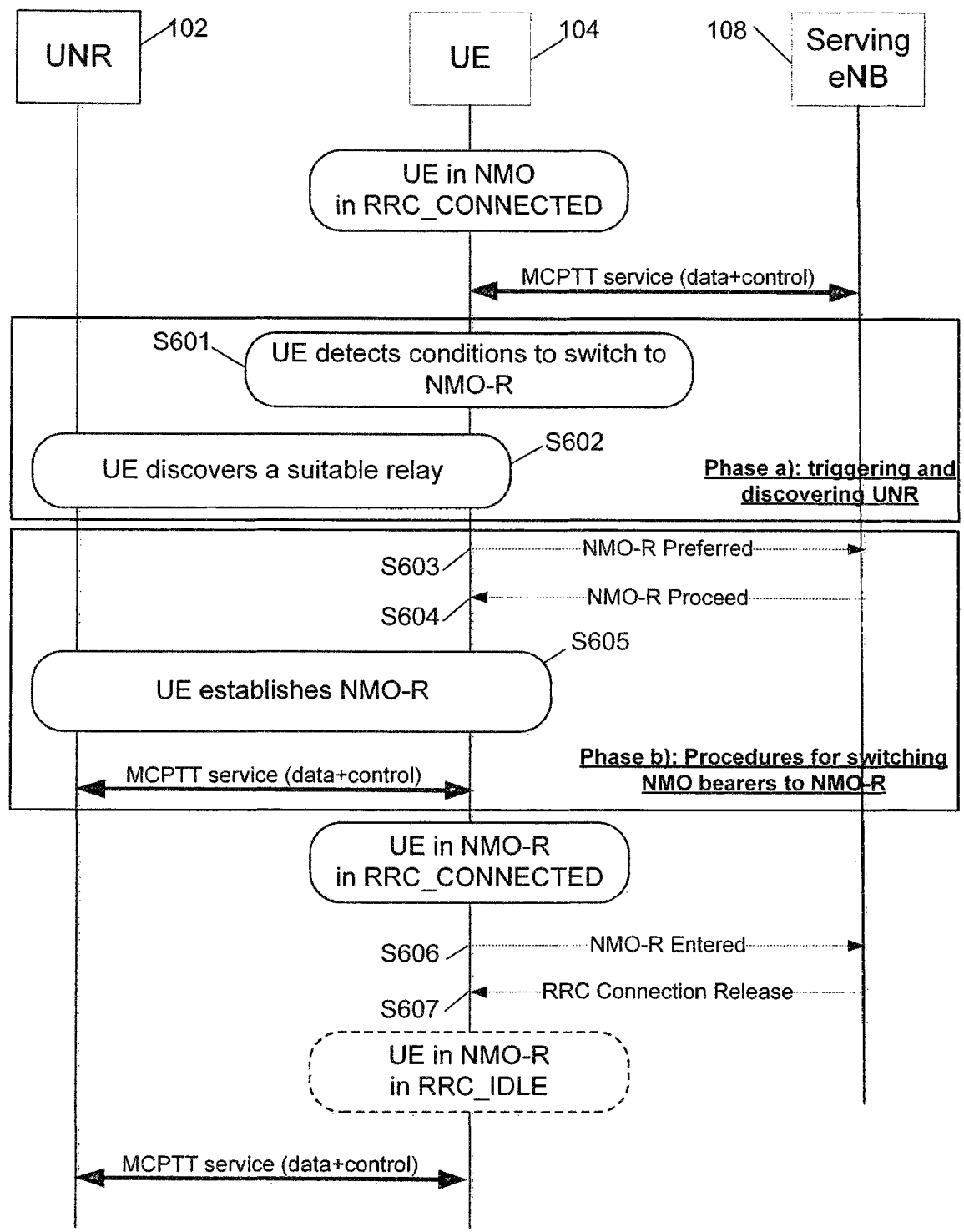
FIG. 6 is an example event flow diagram illustrating a UE-triggered process for switching a UE operating in NMO in the RRC_CONNECTED state to NMO-R using a Make-Before-Break (MBB) approach according to an aspect of the present disclosure.

Referring to FIG. 6, the UE 104 detects, at step S601, a condition to initiate UNR discovery as described above (i.e. a trigger). The UE 104 performs, at step S602, the discovery of UNRs 102 in communication range able to provide connectivity for the service the UE 104 is interested in and selects an appropriate relay, as described above. The UE 104 may send, at step S603, a NMO-R Preferred indication to the network to make the network aware of the UE's intention to switch to NMO-R in a short term and to get the authorization from the network to perform the switch.

The network may answer, at step S604, the NMO-R Preferred indication with a NMO-R Proceed indication to permit the UE 104 to proceed to switch immediately. In some implementations, the NMO-R Proceed indication may include the ProSe configuration of the cell (this option is applicable when the ProSe frequency is owned by the serving cell thereby enabling the UE 104 to adopt the signaled ProSe configuration for NMO-R operation). As an example, upon receiving NMO-R preferred indication, the network may include ProSe configuration parameters allowing the UE 104 to autonomously select resources from resource pools to transmit Sidelink Control and data or discovery messages (i.e. UE autonomous resource selection, also referred to as Mode 2 Direct Communication or Type 1 Discovery), thereby enabling the UE 104 to use the resources when out of coverage. In case the network does not send such indication, the UE 104 remains in NMO (which would result in a Break-Before-Make scenario). In another option, the network may include the details of target UNRs 102 (i.e. the ProSe layer 2 IDs of the target relays 102) in the NMO-R proceed indication. The target UNR information may help the UE 104 in performing a further discovery step to discover a more suitable UNR 102 if appropriate. It is noted that steps S603 and/or S604 may be optional.

During the one-to-one connection establishment with the UNR 102, at step S605, the UE also performs the steps described in FIG. 5. The UE 104 then operates in NMO-R while still in RRC_CONNECTED state.

At step S606, the UE 104 indicates that it has completed the switch to NMO-R to the network by sending an NMO-R Entered indication. On receipt of the NMO-R Entered indication, the network may release, at step S607, the RRC connection and the UE 104 enters RRC_IDLE. A new release cause value may be set in the RRC Connection Release message in order to indicate to not trigger service request procedure and keep the existing EPS bearers. When the UE 104 establishes corresponding PC5 bearers, these PC5 bearers are associated with the EPS bearers. If the UE 104 does not inform the network of the switch, or if the network does not release the RRC connection, the UE 104 remains in RRC_CONNECTED until/unless a RLF is experienced and the UE 104 loses network Uu connectivity.

Further variants of the Make-Before-Break approach presented above can be considered, such as, upon reception of the NMO-R preferred indication at step S603, the network may elect to send a newly defined indication Switch to NMO-R Deferred, as a result of which the UE 104 remains in NMO and does not initiate the switch to NMO-R, until/unless a RLF is experienced. Additionally, the UE 104 may start a timer at the sending of the NMO-R preferred indication to the network, at step S603. If the timer elapses before the UE 104 receives a NMO-R proceed or a Switch to NMO-R deferred, the UE 104 initiates the switch to NMO-R.

Choice Between Break-Before-Make and Make-Before-Break

UE capabilities may be considered in the choice between BBM and MBB. A UE 104 that can support NMO-R whilst in RRC_CONNECTED state can adopt a Make-Before-Break approach (i.e. according to FIG. 6) whereas a UE 104 that is not capable of supporting NMO-R in RRC_CONNECTED state will employ the Break-Before-Make approach (according to FIG. 4).

For UEs 104 that can support both MBB and BBM, the choice between Break-Before-Make and Make-Before-Break approaches may further depend on the criticality of the service in use (e.g., on the priority of the MCPTT group call in which the user is involved), whether the UE 104 "has the floor" and is engaged in uplink transmission, the ProSe configuration, or other QoS related criteria. Typically, Make-Before-Break should be used in case of high priority or delay-sensitive communications, or if the MCPTT user is the current talker. Although it is assumed that discovery of UNRs 104 may be performed in parallel to NMO, discovery may incur a power penalty as highlighted above. In case of choosing a BBM strategy, the UE 104 can defer discovery until the UE 104 effectively loses network coverage (i.e. the NMO leg is broken). This further minimizes the number of discovery attempts and may be appropriate for delay tolerant bearers where BBM is selected.

If the ProSe resources to enable NMO-R are available for the UE 104 only in one of the RRC states (e.g., only in RRC_CONNECTED state—i.e. operating scheduled resource allocation only) then the eNB 108 may keep the UE 104 in RRC_CONNECTED state. On the other hand, if the ProSe resources are also available for the UE 104 in RRC_IDLE state (i.e. UE autonomous resource selection is applicable) then the eNB 108 may choose to send the UE 104 to RRC_IDLE state depending on other criteria as mentioned above. Note that availability of pre-allocated ProSe resources in RRC_IDLE state may be helpful for the UE 104 to be able to receive the service when the UE 104 is totally out of coverage.

The above choice between the two approaches may be made at the UE 104 or at the network or may be a cooperative decision between the UE 104 and the network based on some interaction between them. For instance, the UE 104 may select a preference for one of the above approaches (i.e. Make-Before-Break or Break-Before-Make) and may indicate this preference to the network using the NMO-R preferred message. The network may then consider the preference/choice indicated by the UE 104 along with other criteria for deciding between the approaches as mentioned above. Upon deciding on an approach, the chosen approach is then executed as per FIG. 4 or FIG. 6. Specifically, the network, upon receiving an indication indicating preference for NMO-R, responds by sending a RRC Connection Release message to a UE 104 only supporting BBM and may keep the UE 104 in RRC_CONNECTED if the UE 104 supports MBB. If the UE 104 supports MBB, the network may further decide to still send a RRC Connection Release message to the UE 104 if deemed appropriate based on the criticality of the active NMO bearers (e.g., in case of delay tolerant NMO bearers, the network may choose to release the RRC connection— this option will be useful, for instance, when the network is congested and releasing the UE 104 earlier would help releasing the congestion or reducing interference situation in the network, etc).

UE Preference Indication

Any of the following may be used for indicating UE preference to switch to NMO-R (i.e. NMO-R preferred or NMO-R Entered indications in above figures):

An RRC message defined to convey this information;

By indicating UE preference in ProSe related signalling (i.e. within the ProSeUEInformation RRC indication);

As an example, a new cause code could be included in the ProSeUEInformation indication to indicate to the network that NMO-R is preferred;

By sending a detach request message. The UE 104 may also include an indication indicating to the network that the detach request is due to preference to switch to NMO-R. In this case, even though the UE 104 sends a detach request message to the network, the UE 104 still keeps the corresponding UE context and switches the Uu bearers to the corresponding PC-5 bearers once the NMO-R is activated. Hence, from the network perspective, the UE 104 may be considered as in "detached" state whilst the UE 104 may store part or all of the UE context information. Alternatively, the network may also keep the UE context. In other words, consider the UE 104 to be in attached state and the network will adopt this different behavior of retaining the UE context of a UE sending "detach" message based on the cause code indicated for the detach (i.e. a cause code indicating that UE 104 is requesting detach to enter NMO-R mode);

By using a new MAC control element (MAC CE);

By using an indication for a power optimised configuration on the network interface (e.g., by using UE assistance information message); or By including a new information element or indicator indicating the preference for switch to NMO-R in any of the messages mentioned above.

UE in RRC_IDLE state

Figure 7:
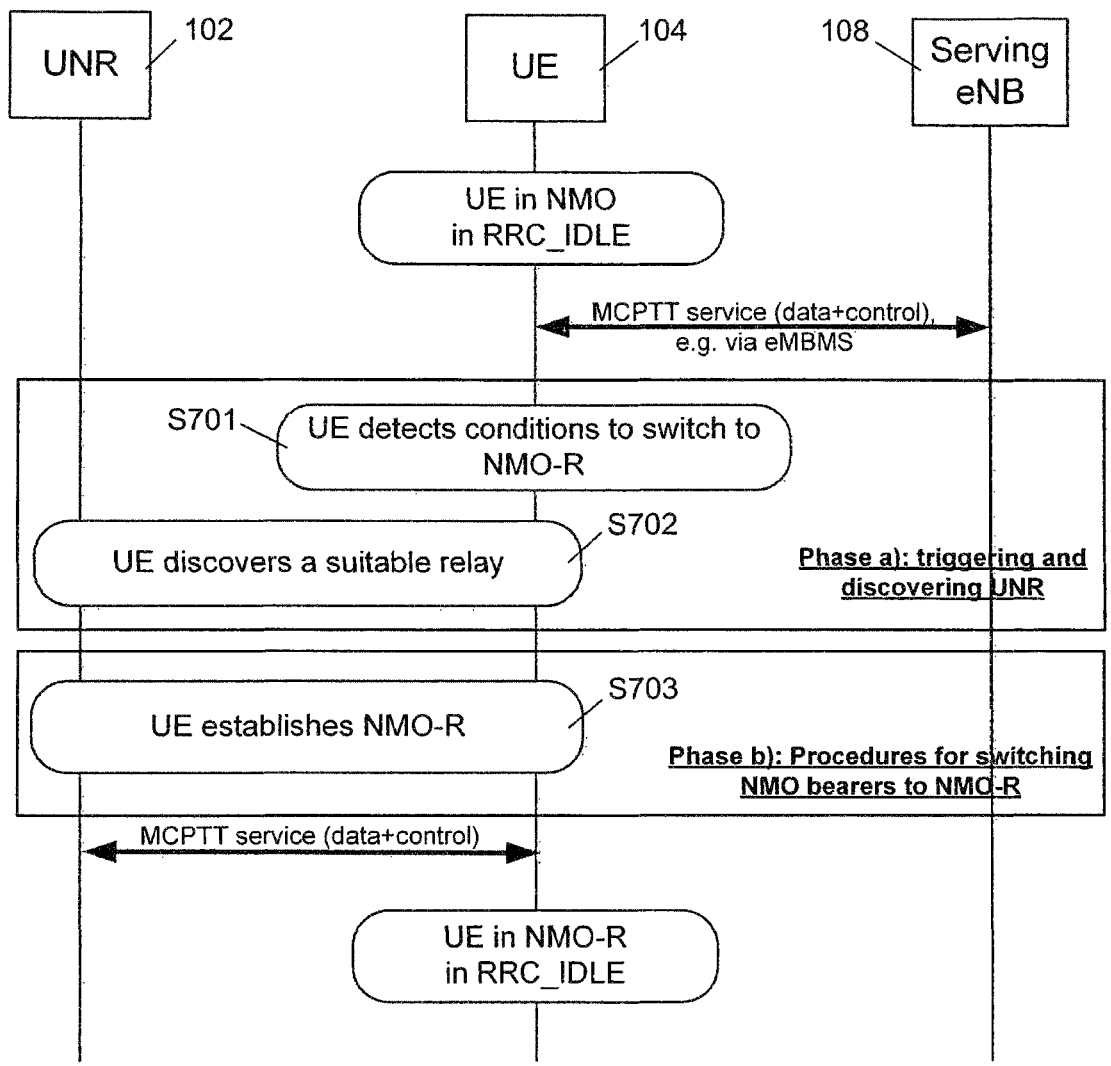
FIG. 7 is an example event flow diagram illustrating a UE-triggered process for switching a UE operating in NMO in the RRC_IDLE state to NMO-R according to an aspect of the present disclosure.

A UE 104 in RRC_IDLE state may be receiving MCPTT service (e.g., via eMBMS). In this case, the UE 104 may autonomously switch to NMO-R upon detecting suitable trigger conditions for such a switch as depicted in FIG. 7. The UE 104 in RRC_IDLE detects, at step S701, that a condition to switch from NMO to NMO-R has been triggered as described above, (e.g., radio link degradation, service quality degradation, etc.) The UE 104 performs, at step S702, the discovery of UNRs 102 in communication range able to provide connectivity for the service in which the UE 104 is interested and selects an appropriate relay 102. The UE 104 performs, in step S703, the operations for the establishment of NMO-R according to the processes described in FIG. 4.

Network Triggered/Assisted Switch to NMO-R

In this instance, the UE 104 is assumed to be in RRC_CONNECTED state in NMO. The network facilitates the UE performing a switch to NMO-R. In one scenario, the network knows the UE capabilities and also its coverage situation (e.g., based on the measurement reports sent by the UE 104). As in the UE triggered switch to NMO-R, both Make-Before-Break and Break-Before-Make approaches are feasible as well.

Figure 8:
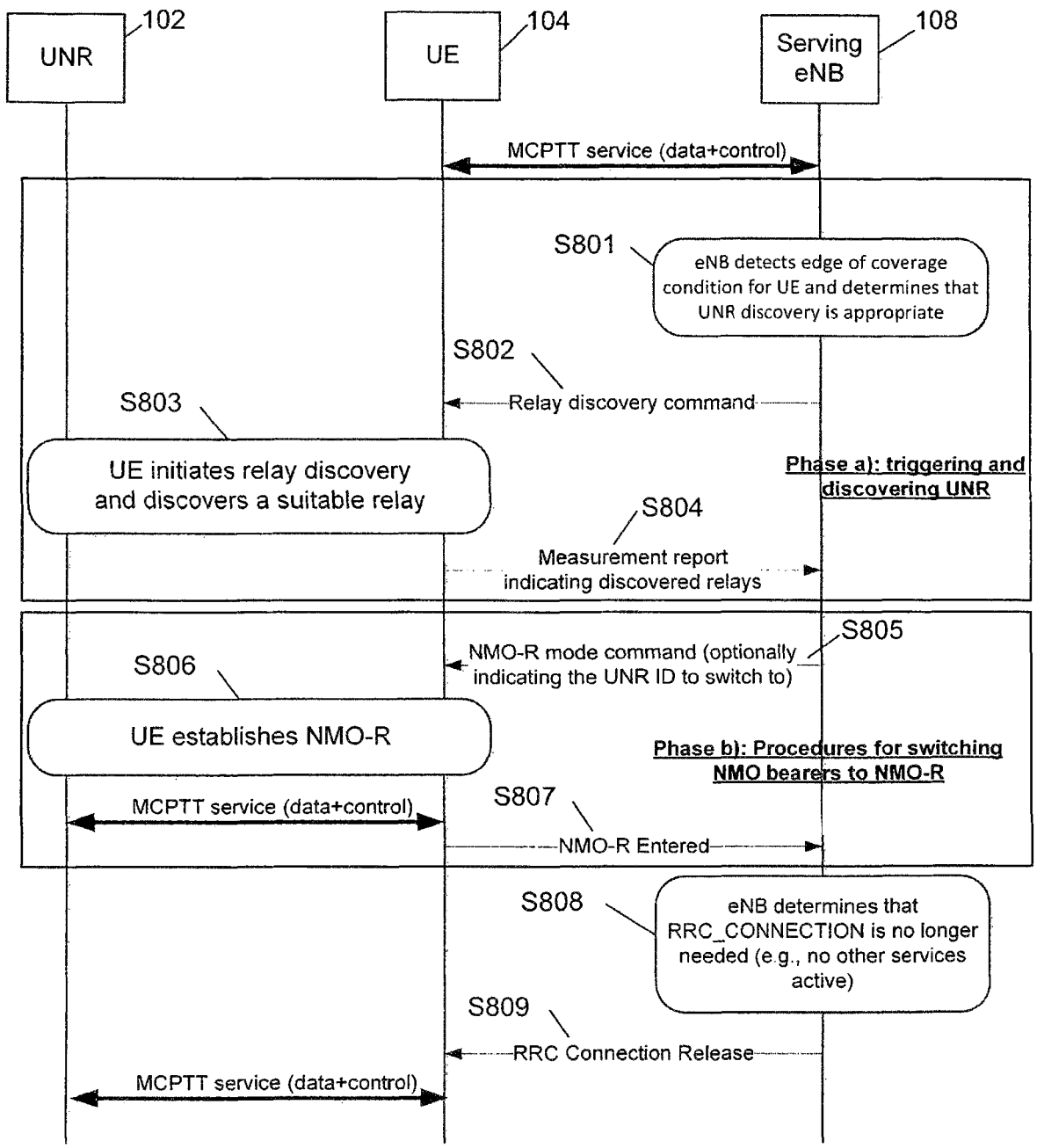
FIG. 8 is an example event flow diagram illustrating a network-triggered process for switching a UE operating in NMO in the RRC_CONNECTED state to NMO-R using a MBB approach according to an aspect of the present disclosure.

When the UE 104 is approaching to the edge of coverage (i.e. triggering conditions satisfied as described above), the eNB 108 instructs the UE 104 to start looking for a UNR 102 in proximity. This scenario is depicted in FIG. 8, which shows the Make-Before-Break case in which the UE 104 is capable of supporting NMO-R whilst in RRC_CONNECTED.

The eNB 108 detects, at step S801, that triggering conditions for initiating UNR discovery have been met as described above. The eNB 108 sends, at step S802, a Relay discovery command message to the UE 104. Alternatively, this command may be an enhanced measurement configuration message. The UE 104 performs, at step S803 a UNR discovery procedure. The UE 104 may optionally obtain, via this procedure, the cell-related identifiers (e.g., C-RNTI) of the UNRs 102 discovered. The cell-related identifiers of the discovered UNRs 102 may be used by the eNB 108 in further steps of the procedure. The UE 104 reports, at step S804, information about one or more UNRs 102 discovered to the eNB 108 (e.g., the received signal power and quality measurements, the L2 source address, the battery level and the available processing power, the UNR's serving cell identifier, etc.) This information may be included in a measurement report, however, a new message may be defined, (e.g., a Relay discovery response message). The UE 104 may also provide additional information such as its own location either included in the above message or in addition to the above messages to facilitate the eNB 108 to find and configure UNRs 102 in the geographical area where the UE 104 is located.

The eNB 108, at step S805, selects one of the discovered relays 102 and instructs the UE 104 to establish one-to-one Sidelink communication (i.e. over PC5) with the selected relay 102 if the UE 104 supports simultaneous Sidelink and Uu communications with a NMO-R mode command. The indication may be conveyed in a RRC connection reconfiguration message. The UE 104 is aware of existing logical channels over Uu and their QoS parameters, e.g., logical channel priority and bit rates served by the eNB 108. The UE 104 may establish the same number of Sidelink logical channels over the PC5 interface with similar QoS parameters as for the logical channels used over the Uu interface. Alternatively the eNB 108 may instruct the UNR 102 to establish a one-to-one Sidelink communication with the UE 104. The eNB 108 is aware of the established logical channels over the Uu interface. The information about the logical channels may be conveyed to the UNR 102 to request the UE 104 to configure the same number of logical channels with similar QoS characteristics.

The UE 104, at step S806, establishes a one-to-one Sidelink communication with the UNR 102 as described above. The UE 104 informs, at step S807, the eNB 108 that the UE 104 has successfully established the Sidelink communication with a NMO-R Entered indication. This indication may be a RRC connection reconfiguration complete message. The network decides, at step S808, whether RRC connection needs to be maintained. The network may, at step S809, send a RRC Connection Release to the UE 104 to instruct the UE 104 to enter RRC_IDLE state. Upon transition to RRC_IDLE the UE 104 switches from the logical channels over Uu to PC5.

Figure 9:
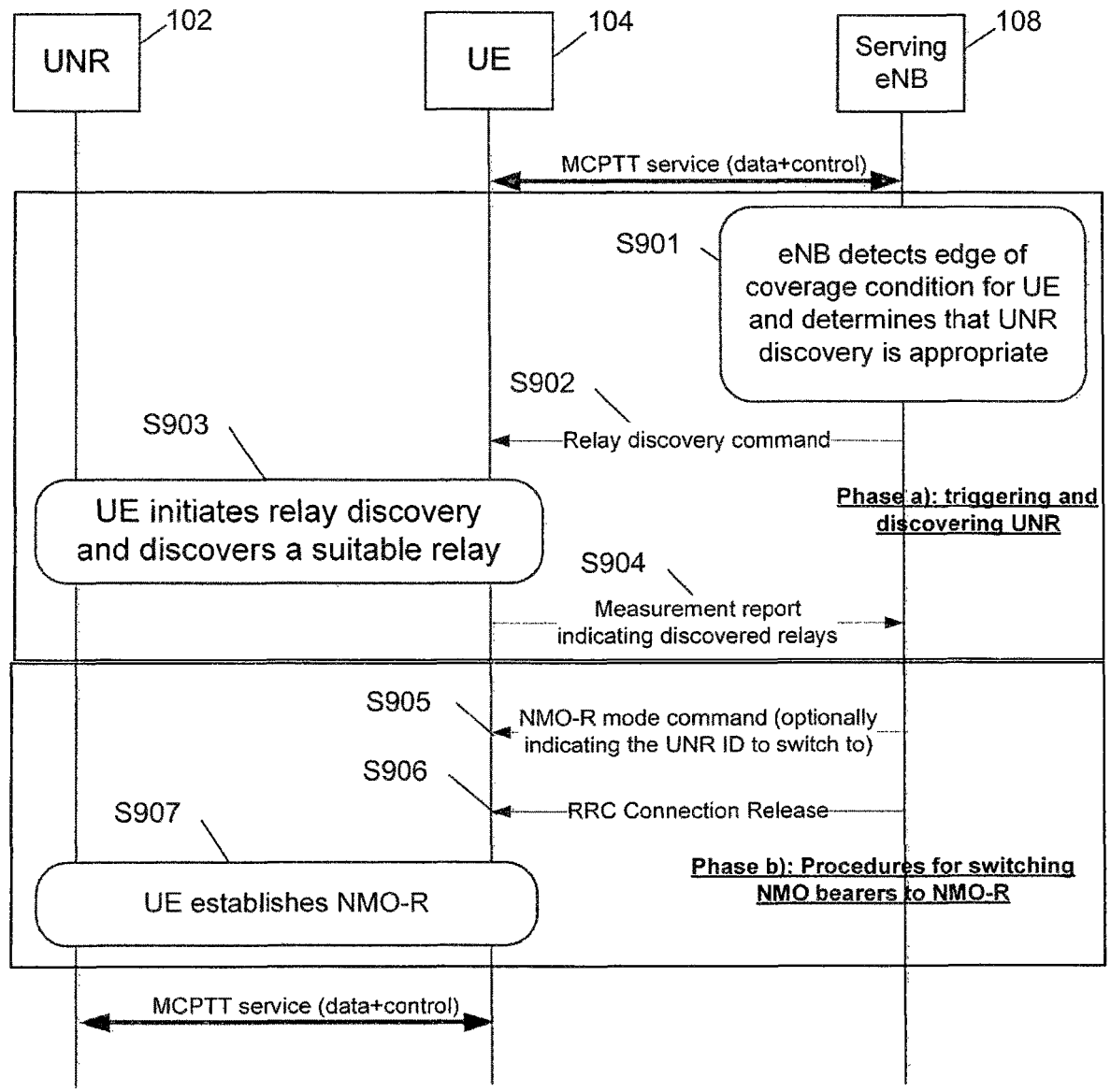
FIG. 9 is an example event flow diagram illustrating a network-triggered process for switching a UE operating in NMO in the RRC_CONNECTED state to NMO-R using a BBM approach according to an aspect of the present disclosure.

If the UE 104 is unable/not capable of supporting NMO-R in RRC_CONNECTED state, one alternative is to adopt Break-Before-Make strategy (other reasons for a choice between Make-Before-Break and Break-Before-Make as described previously are also applicable in making this decision). In this case, the UE 104 receives an RRC connection release message prior to the switch to NMO-R. This procedure is depicted in FIG. 9.

Steps S901 through S904 are substantially similar to steps S801 through S804 in FIG. 8 as described above. In step S905, the eNB 108 selects one UNR 102 and instructs the UE 104 to establish a one-to-one Sidelink communication with the selected UNR 102. The instruction may be conveyed, in step S906, in RRC Connection Release if the UE 104 does not support simultaneous Uu and Sidelink communications. The UE 104 establishes one-to-one Sidelink communication with the UNR 102 as described above, starting NMO-R operation.

In order to facilitate the above scenarios, one or more new indications from the eNB 108 to the UE 104 may be defined. Specifically, to trigger discovery of relays 102 at the UE 104, an indication referred to as Relay discovery command (see e.g., FIG. 8, step S802) may be sent by the eNB 108 to the UE 104. The eNB 108 may configure one or more UEs in relay mode prior to sending this message to the UE 104 if the eNB 108 is aware that there are no potential relays close to the UE 104. The UE 104 starts relay discovery upon receiving this indication (see e.g., FIG. 8, step S803).

To trigger the UE 104 to switch to NMO-R, an indication referred to as NMO-R mode command may be sent by the eNB 108 to the UE 104 (see e.g., FIG. 8, step S805). The UE 104 establishes NMO-R upon receiving this indication. This command can include the identity of the relay 102 with which the UE 104 should associate. Any UNR identity such as the C-RNTI of the relay UE 102 or the ProSe UE ID (i.e. the source Layer-2 ID) of the UNR 102 may be used for this purpose.

The UE 104 may confirm the completion of an NMO-R switch to the eNB 108 by sending an indication referred to as NMO-R Entered (see e.g., FIG. 8, step S807). The eNB 108 may initiate mechanisms to consolidate and potentially release the RRC connection of the UE 104 (e.g., when no other service configured to use Uu interface is active) upon receiving this indication (see e.g., FIG. 8, step S808).

Any of the above indications may be included in an existing or a new RRC message, or may be conveyed via a new MAC Control Element.

Further, the measurement report message, defined by 3GPP TS 36.331, may be enhanced to also indicate the discovered relays (see e.g., FIG. 8, step S804). The Source Layer-2 ID (ProSe UE ID), defined by 3GPP TS 23.303, or the C-RNTI of the UNR 102 or C-RNTI of the UNR 102 can be included in the measurement report message for this purpose. The network may select one of the reported UNRs 102 as the preferred candidate for connecting the UE 104 and can indicate this in the NMO-R mode command (see e.g., FIG. 8, step S805). Alternatively, the network may indicate a subset of relays, or otherwise, a ranked list of relays, in the NMO-R mode command. The network may prioritize the relays 102 within its own coverage over the relays 102 that are not in its coverage.

Figure 10:
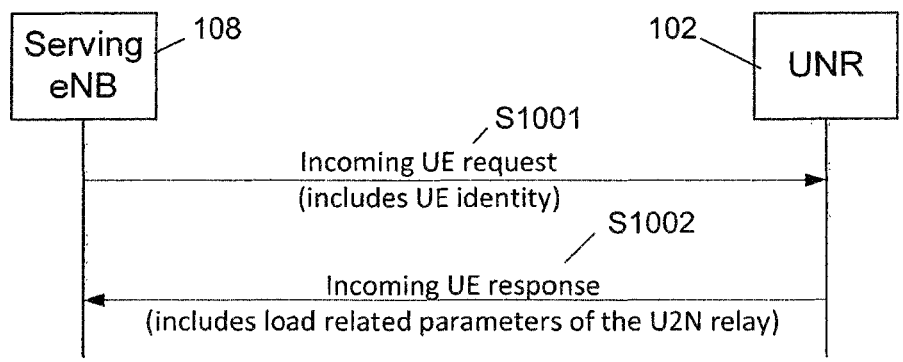
FIG. 10 is an example event flow diagram illustrating a process for interrogating one or more UNRs about their capacity to support an additional incoming UE according to an aspect of the present disclosure.

As a further option, the eNB 108 may interrogate one or more UNRs 102 about their capacity to support an additional incoming UE 104. This information may be helpful for load balancing purposes between the UNRs 102. Communication between the eNB 108 and UNRs 102 may be as shown in FIG. 10.

The Incoming UE request message in step S1001 may include the UE identifier of the potential incoming UE 104. If there is more than one possible UNR 102 under the eNB control, the eNB 108 may select one UNR 102 or prepare more than one UNR 102 for the incoming UE 104 by providing the potential UNRs 102 with the UE identifier. This UE identifier can be the ProSe UE ID of the UE 104 or any other identity by which the UNR 102 can identify the incoming UE 104 on the PC5 link. The UE ID of the incoming UE 104 may be used by the relay 102 to establish the Sidelink connection. As a response to this message, the UNR 102 may send the Incoming UE response message, at step S1002. This message can include parameters that the eNB 108 can use to select a UNR 102 among multiple relays candidates. Examples of these parameters are supported applications/application IDs, battery status, mobility status, position/geographical location in the cell, load (e.g., number of out of coverage UEs currently associated with the UNR 102, or relative load percentage), number of MCPTT groups which the relay forwards, an explicit indication to reject the additional incoming UE 104, etc.

Based on these parameters, the eNB 108 can select an appropriate UNR 102 and include the identity (ProSe UE ID) of the selected relay 102 in the NMO-R mode command transmitted to the UE 104 (see e.g., FIG. 8, step S805). Alternatively the Incoming UE request may be utilized for the eNB 108 to instruct the UNR 102 to establish a one-to-one connection with the UE 104. In this case, the request may include the UE's L2 source address and the logical channels to be established over Sidelink.

NMO-R to NMO Switch

A UE 104 in NMO-R mode of operation may move into network coverage where NMO mode of operation is potentially available. NMO can be available when the PDN connectivity to the service can be provided by the network. NMO availability can be determined by the UE 104 based on the system information of the network (i.e. availability of MBMS sessions that the UE 104 is interested in, etc).

In this case, two approaches are disclosed:
1) The UE switches to NMO upon detecting network coverage supporting NMO.
2) The UE stays in NMO-R until a switch to NMO is deemed necessary based on triggering criteria such as operation in NMO-R deteriorating, etc.

The UE 104 may be preconfigured to choose between these approaches (e.g., configured in the UICC or via explicit signaling from the network). Alternatively, one specific behavior may be enforced by the standards. The behavior may also be based on the capability of the UE 104 (i.e. whether or not the UE 104 can support NMO-R whilst in RRC_CONNECTED).

UE Always Switches to NMO Upon Finding Coverage

In this instance, an out of coverage UE 104 operating in NMO-R always switches to NMO upon moving into network coverage. Thus, while out of coverage, the UE 104 will be performing cell search (as per standardized cell selection/reselection algorithms) until a suitable cell is found, and selects a suitable cell when available (see 3GPP TS 36.304). Upon selecting the cell, the UE 104 may enter connected mode and update its registration with the MCPTT server 106 via the network. If the UE 104 supports MBB, the UE 104 may initiate establishment of NMO and upon successful registration with the MCPTT server 106 and resuming access to the service, the UE 104 may detach from the UNR 102 and switch to NMO. This process is depicted in FIG. 11.

The UE 104 operating in NMO-R through the UNR 102 enters network coverage and selects a suitable cell, at step S1101. The UE 104 establishes, at step S1102 an RRC connection in order to get MCPTT service in the serving cell. The UE 104 accesses, at step S1103, the MCPTT service using IMS/SIP procedures after mutual authentication and establishment of secure association (SA-R) between the UE 104 and the MCPTT server 106. If needed, (i.e. not prevented by the MCPTT server 106), the UE 104 may have to suppress duplicate information that could be temporarily received from the relay 102 and from the network. The UE 104 sends, at step S1104, a Sidelink Disconnect indication to the UNR 102 to stop the relay transferring MCPTT information for this UE 104. The UNR 102 stops transmissions directed towards the UE 104, at step S1105. The UNR 102 may answer the Sidelink Disconnect indication by a Sidelink Disconnect Ack, at step S1106. If there are no more UEs 104 employing relaying operation by the UNR 102, then the UNR 102 may cease its relaying activity, at step S1107, and send a UNR Mode Stop indication to the serving eNB 108. It should be noted that the serving eNB of the UNR 102 may or may not be the same one as the serving eNB for the UE 104. As an example, the UNR Mode Stop indication may be included in an RRC message, such as ProSe Interest Indication, indicating that the UNR 102 is no longer interested in ProSe.

Figure 11:
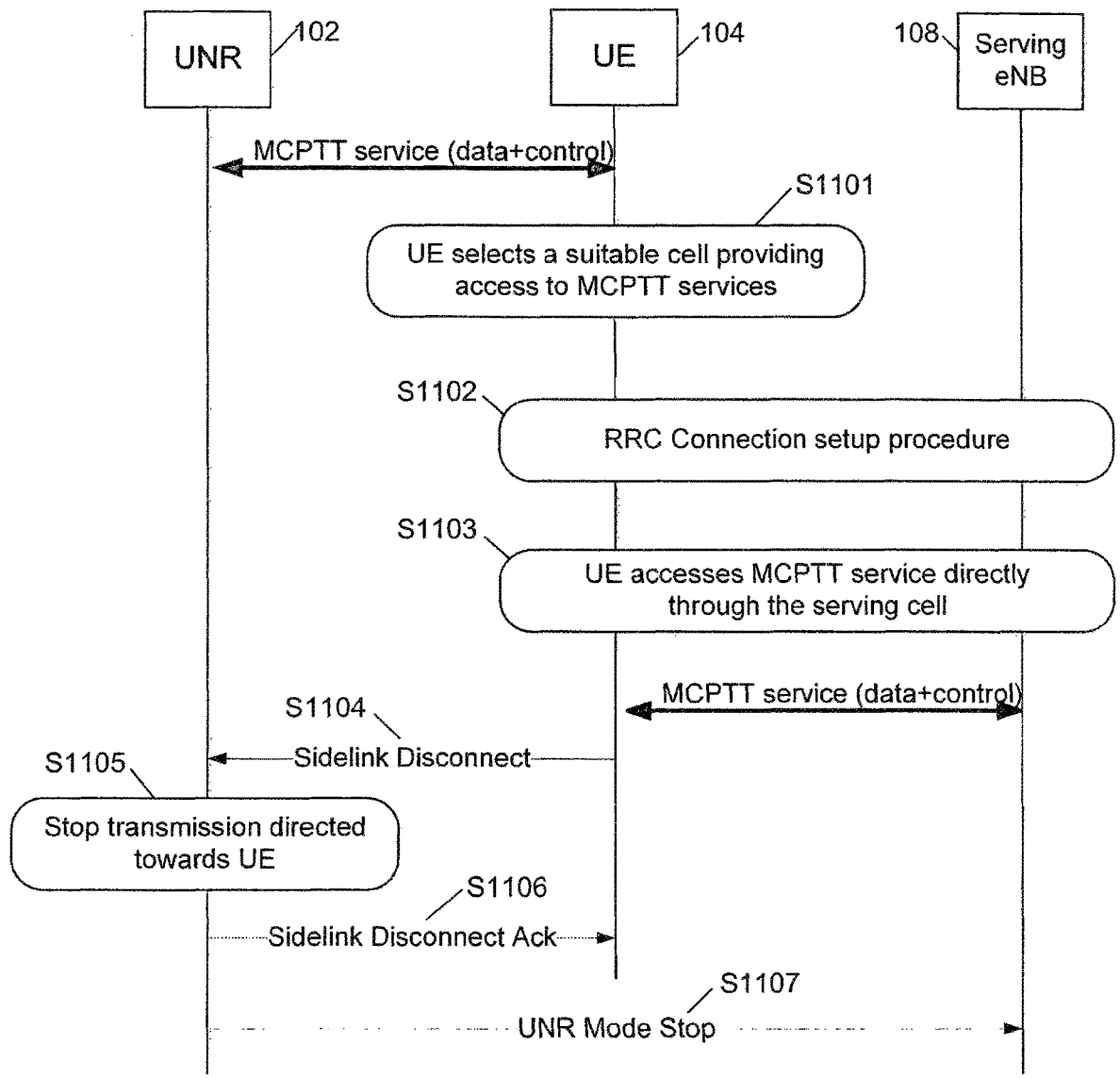
FIG. 11 is an example event flow diagram illustrating a process for unconditionally switching a UE operating in NMO-R to NMO using a MBB approach upon finding network coverage, according to an aspect of the present disclosure.

The procedure discussed with respect to FIG. 11 works when the UE 104 can support NMO-R while in RRC_CONNECTED state. However, if the UE 104 is not capable of this, the UE 104 may switch to NMO after disconnecting from the UNR 102. This choice of using Break-Before-Make or Make-Before-Break may involve other considerations as mentioned above.

Figure 12:
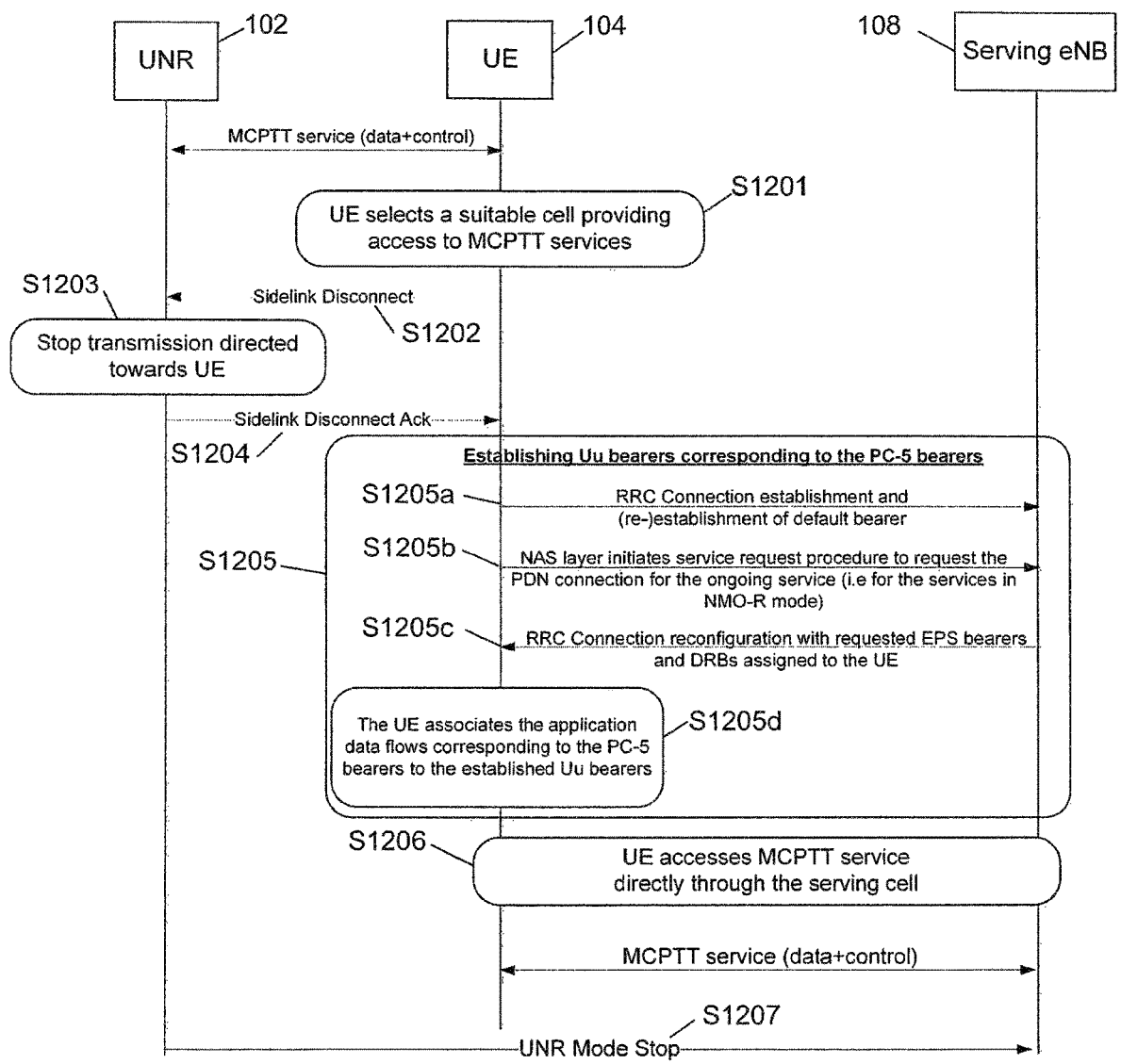
FIG. 12 is an example event flow diagram illustrating a process for unconditionally switching a UE operating in NMO-R to NMO using a BBM approach upon finding network coverage, according to an aspect of the present disclosure.

The "Break-Before-Make" option is depicted in FIG. 12. The UE 104 operating in NMO-R through the UNR 102 enters network coverage, at step S1201 and selects a suitable cell. The UE 104 sends, at step S1202, a Sidelink Disconnect indication to the UNR 102 to stop the relay transferring MCPTT information for this UE 104. The UNR 102 stops transmissions directed towards the UE 104, at step S1203.

The UNR 102 may answer the Sidelink Disconnect indication, at step S1204 by a Sidelink Disconnect Ack.

The UE 104 establishes, at step S1205, an RRC connection in order to get MCPTT service in the serving cell. This procedure involves establishment, at step S1205*a*, of the EPS bearers corresponding to the services that the UE 104 is receiving over the PC-5 link. A Non-Access Stratum (NAS) layer in UE 104 triggers, at step S1205*b*, the service request procedure to establish the needed EPS bearers corresponding to the bearers that the UE is receiving the service over when in NMO-R. The service request message may be forwarded by the eNB 108 to the MME to configure appropriate EPS bearers for the UE 104. The eNB 108 responds by sending an RRC Configuration, at step S1205*c*, to the UE 104 and this RRC configuration includes the configuration of the EPS bearers and DRBs to serve the UE 104 in NMO. The UE 104, at step S1205*d*, associates the application data flows corresponding to the PC-5 bearers to the established Uu bearers.

The UE 104 accesses, at step S1206, the MCPTT service 106 using IMS/SIP procedures after mutual authentication and establishment of secure association (SA-R) between UE 104 and the MCPTT server 106. Upon successfully establishing the Uu bearers, the application data flows may be switched to the established Uu bearers. If there are no more UEs 104 employing relaying operation, the UNR 102 may stop its relaying activity, at step S1207, and send a UNR Mode Stop indication to its serving eNB 108. It should be noted that the serving eNB of the UNR 102 may not be the same eNB as the serving eNB of the UE 104.

UE Conditionally Switches to NMO (e.g., NMO-R Service Deteriorating, Explicit Signaling from Network or the UNR, Etc.)

Triggering Conditions for Switching to NMO Mode

In this instance, the out of coverage UE 104 does not switch to NMO automatically or unconditionally upon finding network coverage. Instead, the UE 104 continues operating in NMO-R until a trigger causes the UE 104 to switch to NMO-R. Examples of such conditions include radio link degradation on the PC5 interface, which may include degradation of the PC5 link quality or loss of synchronization on PC5 link, etc. Another condition may be service quality degradation where an application detects that the quality of the received service has degraded below a predetermined threshold. For instance, this service quality may include the detection of a predetermined number or percentage of missed/un-decoded voice frames or video frames, determination that the residual bit error rate on the application packets has exceeded a predetermined threshold, etc. Another condition may be the service becoming unavailable such that the UNR 102 no longer supports the service the UE 104 is interested in (e.g., due to lack of PC5 resources, etc.). Other UNR related parameters indicating deterioration could also trigger switching, such as a low battery level reported by the UNR 102 or other explicit messages received from the UNR 102 necessitating a switch to NMO. Examples of such explicit messages may include commands indicating UNR mode termination of the relay or capacity of the relay exceeded, etc.

Switching to NMO

Figure 13:
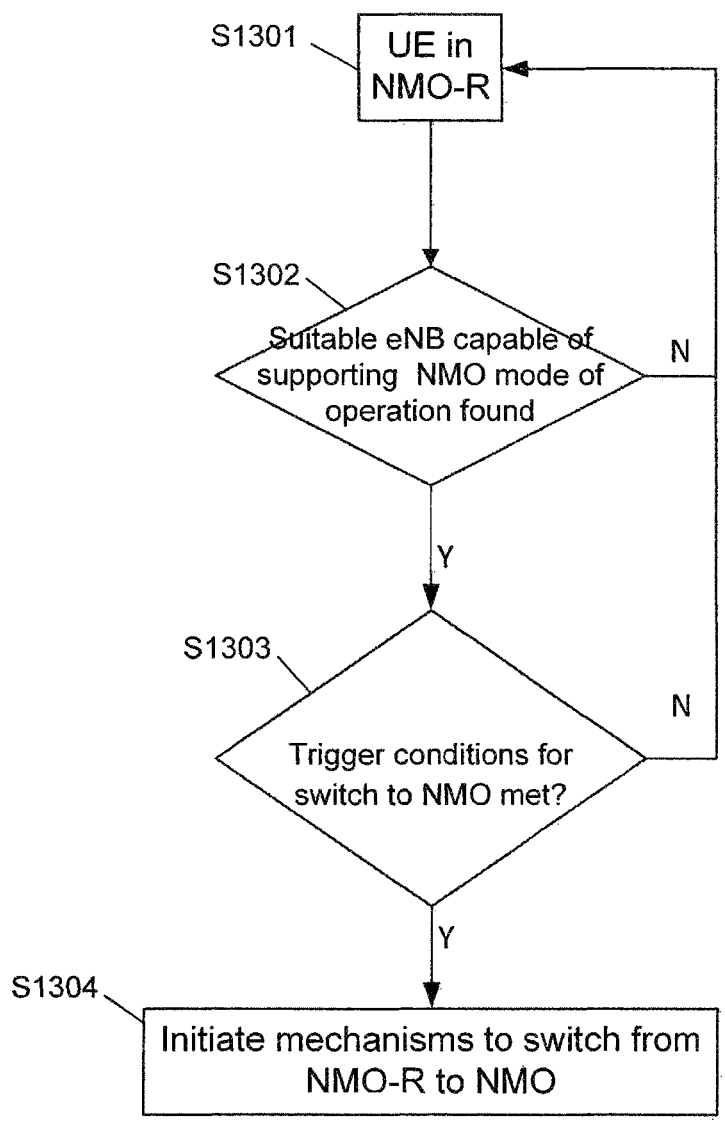
FIG. 13 is a flow chart illustrating an example process for triggering the switch of a UE operating in NMO-R to NMO in accordance with one aspect of the present disclosure.

The flowchart 1300 of FIG. 13 illustrates an example procedure for triggering the switch to NMO. The UE 104 begins, at block S1301, in NMO-R. If a suitable eNB 108 capable of supporting the UE 104 during NMO operation is found, at block S1302, and the trigger conditions for the switch to NMO are met, at block S1303, the UE 104 initiates, at block S1304, mechanisms to switch from NMO-R to NMO.

Figure 14:
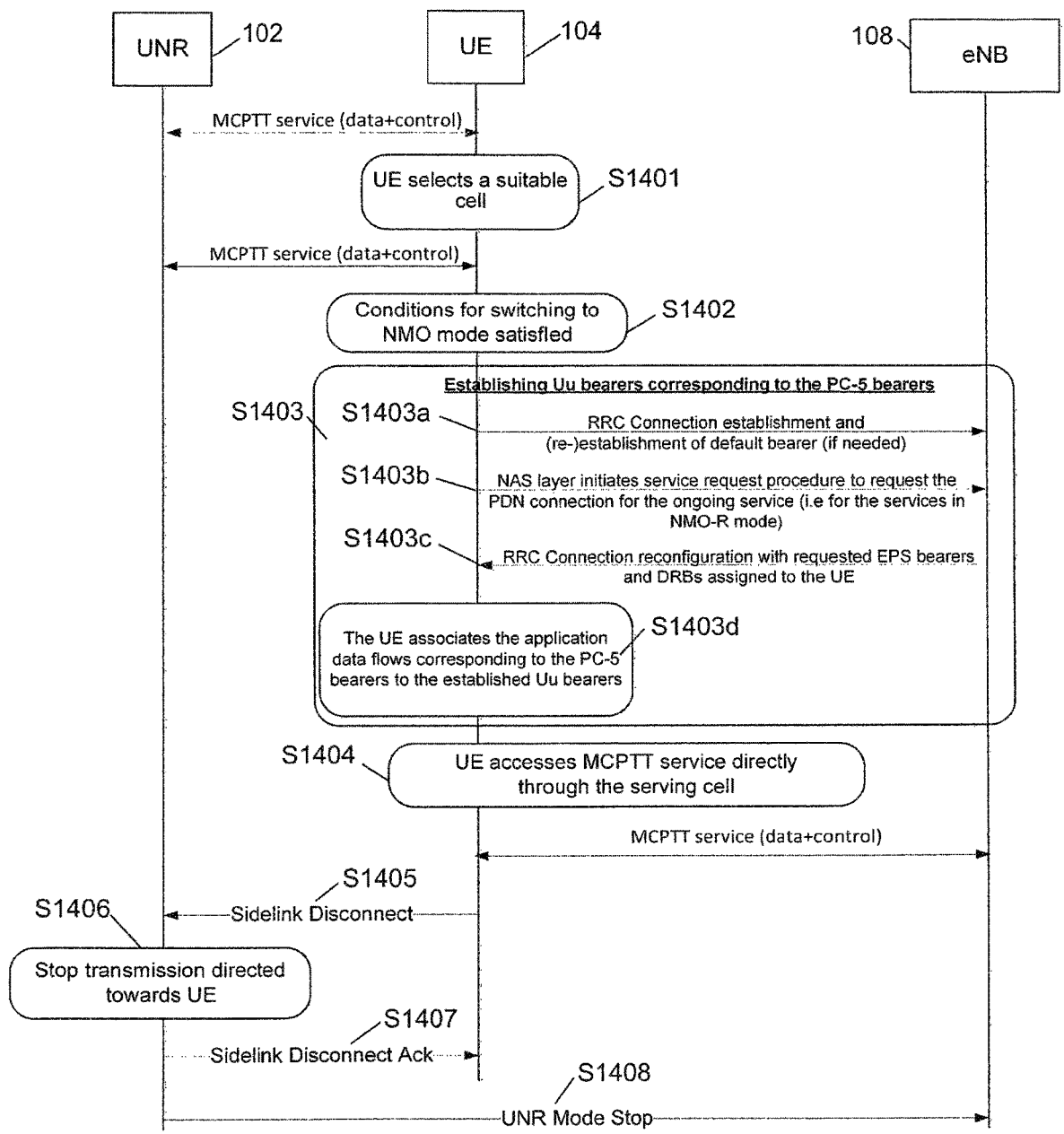
FIG. 14 is an example event flow diagram illustrating a process for switching a UE operating in NMO-R to NMO using a MBB approach upon satisfying triggering conditions, according to an aspect of the present disclosure.

The procedure for the UE 104 to switch to NMO mode of operation is detailed in FIG. 14 and is somewhat similar to the procedures depicted in FIGS. 11 and 12. The UE 104 operating in NMO-R through the UNR 102 enters network coverage, at step S1401, and selects a suitable cell. The UE 104 determines, at step S1402, that conditions to switch to NMO are satisfied as described above. The UE 104 establishes, at step S1403, an RRC connection in order to get MCPTT service in the serving cell (if the UE 104 has not already switched to RRC_CONNECTED for other reasons such as being paged by the network for a mobile terminating session, etc.) and establishes the PDN connection(s) employed by the services carried over PC5 interface. The service request procedure is initiated by a NAS layer to establish the necessary EPS bearers for NMO.

The UE 104 accesses, at step S1404, the MCPTT service 106 using IMS/SIP procedures after mutual authentication and establishment of secure association (SA-R) between UE 104 and the MCPTT server 106. Upon successfully establishing the Uu bearers, the application data flows may be switched to the established Uu bearers. If needed, (e.g., not prevented by the MCPTT server 106), the UE 104 may suppress duplicate information that could be temporarily received from the relay and from the network.

The UE 104 sends, at step S1405, a Sidelink Disconnect indication to the UNR 102 to stop the relay transferring MCPTT information for this UE 104. At step S1406, the UNR 102 stops transmissions directed towards the UE 104. The UNR 102 may answer, at step S1407, the Sidelink Disconnect indication by a Sidelink Disconnect Ack. If there are no more UEs 104 employing relaying operation, the UNR 102 may stop its relaying activity, at step S1408, and send a UNR Mode Stop indication to the serving eNB 108.

Figure 15:
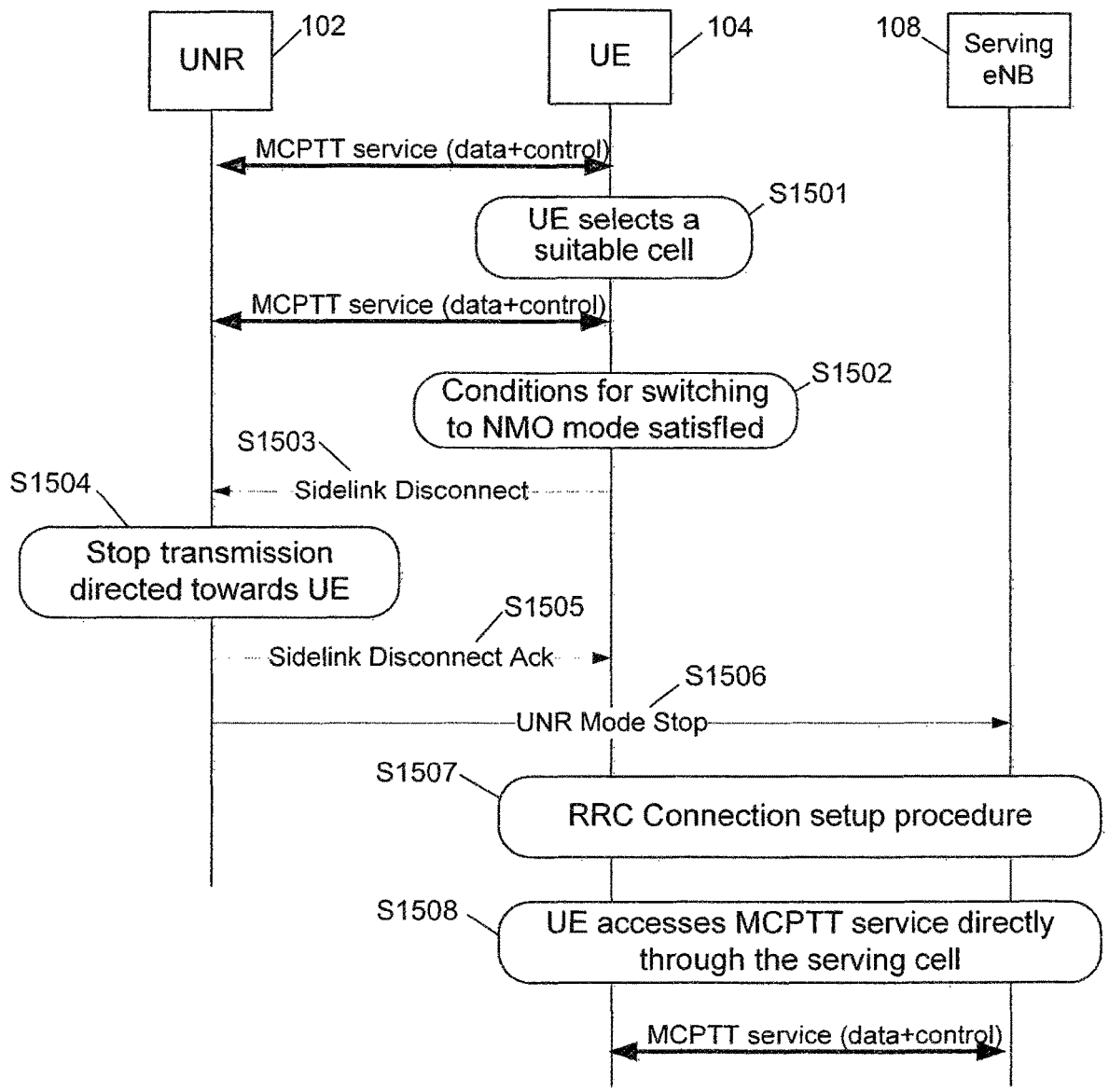
FIG. 15 is an example event flow diagram illustrating a process for switching a UE operating in NMO-R to NMO using a BBM approach upon satisfying triggering conditions, according to an aspect of the present disclosure.

Again, if the UE 104 is not capable of supporting NMO-R whilst in RRC_CONNECTED state, then a Break-Before-Make solution would be used as depicted in FIG. 15. The UE 104, operating in NMO-R through the UNR 102, enters network coverage and selects a suitable cell, at step S1501. The UE 104 determines, at step S1502, that conditions to switch to NMO are satisfied as described above. The UE 104 sends, at step S1503, a Sidelink Disconnect indication to the UNR 102 to stop the relay transferring MCPTT information for this UE 104. The UNR 102 stops transmissions directed towards the UE 104, at step S1504. The UNR 102 may answer, at step S1505, the Sidelink Disconnect indication by a Sidelink Disconnect Ack. If there are no more UEs 104 employing relaying operation, the UNR 102 may stop its relaying activity, at step S1506, and send a UNR Mode Stop indication to the serving eNB 108. The UE 104 establishes an RRC connection in step S1507 in order to get MCPTT service in the serving cell (if the UE has not previously switched to RRC_CONNECTED for other reasons) and establish PDN connection(s) required by the services provided over PC5. The UE 104 accesses the MCPTT service, at step S1508, using IMS/SIP procedures after mutual authentication and establishment of secure association (SA-R) between UE 104 the MCPTT server 106.

The Equipment

Figure 16:
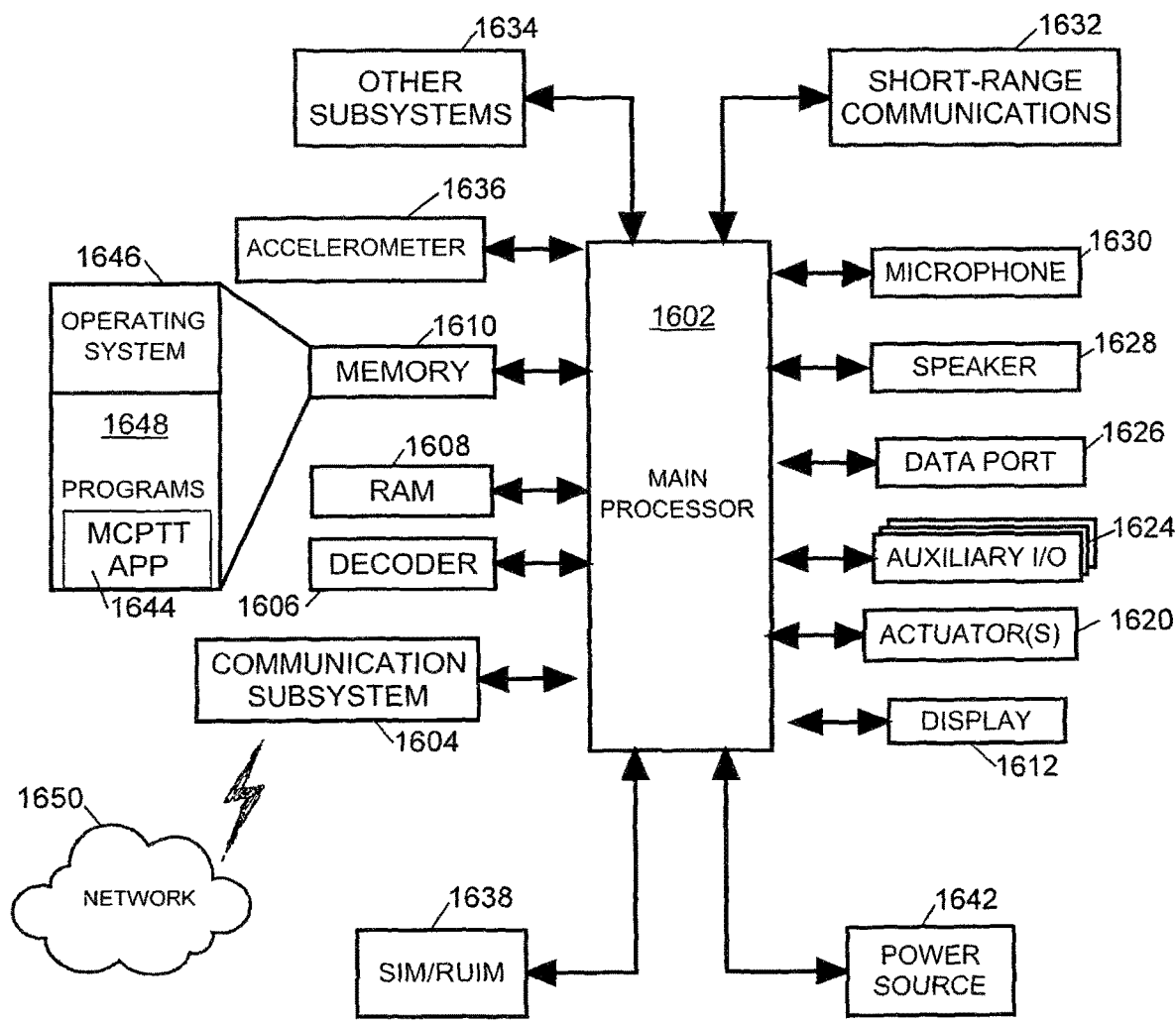
FIG. 16 is a block diagram of an example UE in accordance with an aspect of the present disclosure.

A block diagram of an example of a wireless communication device 1600 (such as UE 104 and UNR 102) is shown in FIG. 16. The wireless communication device 1600 includes multiple components, such as a processor 1602 that controls the overall operation of the wireless communication device. Communication functions, including data and voice communications, are performed through a communication subsystem 1604. The communication subsystem 1604 may include a plurality of receivers and transmitters operating on one or more frequencies to allow simultaneous connection to two or more different entities. For UEs having MBB capabilities, at least two receivers and two transmitters may be employed. Data received by the wireless communication device is decompressed and decrypted by a decoder 1606. The communication subsystem 1604 receives messages from and sends messages to a wireless network 1650. The wireless network 1650 may be any type of wireless network, including, but not limited to, data wireless networks, voice wireless networks, and networks that support both voice and data communications.

A power source 1642, such as one or more rechargeable batteries or a port to an external power supply, powers the wireless communication device 1600.

The processor 1602 interacts with other components, such as Random Access Memory (RAM) 1608, memory 1610, a display 1612 (which may be a touch-sensitive display), one or more actuators 1620, an auxiliary input/output (I/O) subsystem 1624, a data port 1626, a speaker 1628, a microphone 1630, short-range communications 1632, and other device subsystems 1634. User-interaction with a graphical user interface is performed through the touch-sensitive display 1612. Information, such as text, characters, symbols, images, icons, and other items that may be displayed or rendered on a portable electronic device, is displayed on the touch-sensitive display 1612 via the processor 1602. The processor 1602 may interact with an accelerometer 1636 that may be utilized to detect direction of gravitational forces or gravity-induced reaction forces.

To identify a subscriber for network access, the wireless communication device 1600 uses a UICC such as a Subscriber Identity Module or a Removable User Identity Module (SIM/RUIM) card 1638 for communication with a network, such as the wireless network 1650. Alternatively, user identification information may be programmed into memory 1610.

The wireless communication device 1600 includes an operating system 1646 and software programs or components 1648, such as the MCPTT application 1644, that are executed by the processor 1602 and are typically stored in a persistent, updatable store such as the memory 1610. Additional applications or programs may be loaded onto the wireless communication device 102, 104 through the wireless network 1650, the auxiliary I/O subsystem 1624, the data port 1626, the short-range communications subsystem 1632, or any other suitable subsystem 1634.

A received signal such as a text message, an e-mail message, instant message or web page download is processed by the communication subsystem 1604 and input to the processor 1602. The processor 1602 processes the received signal for output to the display 1612 and/or to the auxiliary I/O subsystem 1624. A subscriber may generate data items, for example e-mail messages, which may be transmitted over the wireless network 1650 through the communication subsystem 1604. For voice communications, the overall operation of wireless communication device 102, 104 is similar. The speaker 1628 outputs audible information converted from electrical signals, and the microphone 1630 converts audible information into electrical signals for processing.

The touch-sensitive display 1612 may be any suitable touch-sensitive display, such as a capacitive, resistive, infrared, surface acoustic wave (SAW) touch-sensitive display, strain gauge, optical imaging, dispersive signal technology, acoustic pulse recognition, and so forth, as known in the art. A capacitive touch-sensitive display includes a capacitive touch-sensitive overlay. The overlay may be an assembly of multiple layers in a stack including, for example, a substrate, a ground shield layer, a barrier layer, one or more capacitive touch sensor layers separated by a substrate or other barrier, and a cover. The capacitive touch sensor layers may be any suitable material, such as patterned indium tin oxide (ITO).

One or more actuators 1620 may be depressed or activated by applying sufficient force to the actuators 1620 to overcome the actuation force of the actuator. The actuator(s) 1620 may provide input to the processor 1602 when actuated. Actuation of the actuator(s) 1620 may result in provision of tactile feedback.

Figure 17:
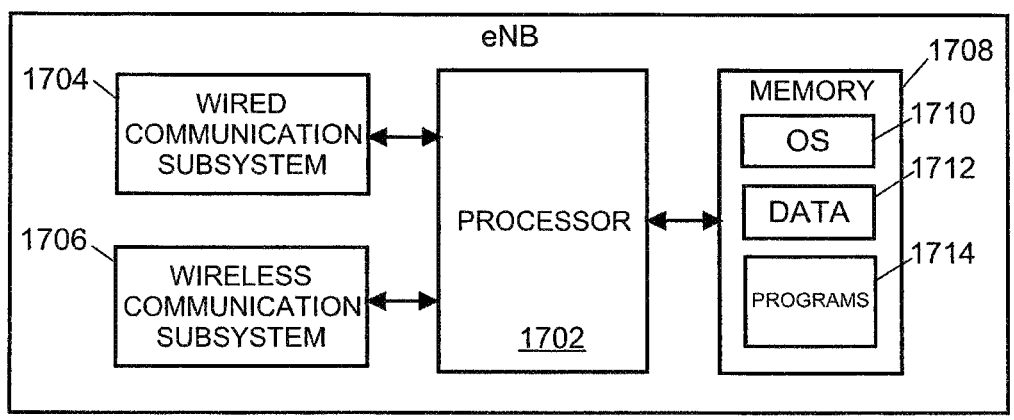
FIG. 17 is a block diagram of an example eNB in accordance with an aspect of the present disclosure.

Turning now to FIG. 17, a block diagram of an example eNB 108 is provided. The eNB 108 includes at least one processor 1702 that controls the overall operation of the eNB 108. Wired communication subsystem 1704 allows the eNB 108 to interact with various other devices, such as servers (e.g., an MCPTT application server), routers, gateways, etc., via a wired network such as the Internet. Wireless communication functions, including data and voice communications, are performed through a wireless communication subsystem 1706.

The eNB 108 includes memory 1708 storing computer-readable instructions for an operating system 1710, data 1712 and software programs or components 1714 that are executed by the processor 1702. It should be noted that other typical functionality and components of an eNB 108 are not shown here for simplicity and brevity.

Aspects of the present disclosure may be embodied as a device or apparatus, system, method or computer program product. Accordingly, aspects of the present disclosure may take the form of an entirely hardware-based embodiment, an entirely software-based embodiment (including firmware, resident software, micro-code, etc.) or an embodiment combining software and hardware that may all generally be referred to herein as a "circuit," "module" or "system." Furthermore, aspects of the present disclosure may take the form of a computer program product embodied in one or more computer readable medium(s) having computer readable program code embodied thereon. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) may include the following tangible media: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. Non-tangible or non-transitory media may include a propagated data signal with computer readable program code embodied therein, for example, in baseband or as part of a carrier wave. Such a propagated signal may take any of a variety of forms, including, but not limited to, electromagnetic, optical, or any suitable combination thereof. Computer program code or instructions for carrying out operations for aspects of the present disclosure may be any combination of one or more programming languages, including an object oriented programming language and conventional procedural programming languages. The program code may execute on one or more devices such as a computer and/or server.

Aspects of the present disclosure have been described above with reference to flowchart illustrations and/or block diagrams of methods, apparatus (systems) and computer program products according to embodiments of the disclosure. In this regard, the flowchart and block diagrams in the figures illustrate the architecture, functionality, and operation of possible implementations of systems, methods and computer program products according to various embodiments. However it should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented wholly or partially by special purpose hardware-based systems that perform the specified functions or acts, or combinations of special purpose hardware and computer instructions. Furthermore it also will be understood that each block of the flowchart illustrations and/or block diagrams, and combinations of blocks in the flowchart illustrations and/or block diagrams, can be implemented wholly or partially by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

Finally, the terminology used herein is for the purpose of describing particular embodiments only and is not intended to be limiting. That is, the description of the present disclosure has been presented for purposes of illustration and description, but is not intended to be exhaustive or limited to the form disclosed. Many modifications and variations will be apparent without departing from the scope of the disclosure defined in the appended claims.

The invention claimed is:

1. A method of switching between modes of operation for a device in a cellular network, the method comprising:
   accessing a service at the device;
   after a determination that the device is approaching an edge of coverage while the device is accessing the service,
   the device receiving, from a first node in the cellular network, a relay discovery command;
   the device sending a measurement report to the first node indicating discovered nodes capable of acting as relay nodes;
   the device receiving, from the first node, a selection of a suitable node to act as a relay node; and
   the device receiving, from the first node, an instruction to initiate a mechanism to switch to accessing the service via the relay node,
   wherein the mechanism to switch to accessing the service via the relay node comprises:
      the device receiving a relay mode proceed indication from the first node; and
      the device receiving a connection release message from the first node.

2. The method of claim 1, wherein the selected suitable node is configured as a relay node prior to receipt of the instruction to initiate the mechanism to switch to accessing the service via the relay node.

3. The method of claim 1, wherein the service is a mission critical push-to-talk over Long Term Evolution service.

4. The method of claim 1, wherein the relay node is a user equipment acting as a user equipment-to-network relay node.

5. The method of claim 1, wherein the measurement report comprises, for each discovered node, at least one of the following parameters:
received signal power;
quality measurements;
an L2 source address;
a battery level; or
an available processing power.

6. The method of claim 1, wherein the mechanism to switch to accessing the service via the relay node further comprises:
after receiving the relay mode proceed indication from the first node, the device sending a relay mode entered indication to the first node; and wherein
the device receiving a connection release message from the first node occurs upon a determination that a radio resource control connection between the device and a serving cell does not need to be maintained.

7. A computer program product for enabling switching between modes of operation for a device in a cellular network, the computer program product comprising a non-transitory computer readable storage medium having computer readable program code embodied therewith, the computer readable program code comprising instructions for execution by the device for:
accessing a service at the device;
after a determination that the device is approaching an edge of coverage while the device is accessing the service,
the device receiving, from a first node in the cellular network, a relay discovery command;
the device sending a measurement report to the first node indicating discovered nodes capable of acting as relay nodes;
the device receiving, from the first node, a selection of a suitable node to act as a relay node; and
the device receiving, from the first node, an instruction to initiate a mechanism to switch to accessing the service via the relay node,
wherein the mechanism to switch to accessing the service via the relay node comprises:
the device receiving a relay mode proceed indication from the first node; and
the device receiving a connection release message from the first node.

8. The computer program product of claim 7, wherein the service is a mission critical push-to-talk over Long Term Evolution service.

9. The computer program product of claim 7, wherein the relay node is a user equipment acting as a user equipment-to-network relay node.

10. The computer program product of claim 7, wherein the measurement report comprises, for each discovered node, at least one of the following parameters:
received signal power;
quality measurements;
an L2 source address;
a battery level; or
an available processing power.

11. The computer program product of claim 7, wherein the mechanism to switch to accessing the service via the relay node comprises:
the device receiving a relay mode proceed indication from the first node;
the device sending a relay mode entered indication to the first node; and
the device receiving a connection release message from the first node upon a determination that a radio resource control connection between the device and a serving cell does not need to be maintained.

12. The computer program product of claim 7, wherein the mechanism to switch to accessing the service via the relay node further comprises:
after receiving the relay mode proceed indication from the first node, the device sending a relay mode entered indication to the first node; and wherein
the device receiving a connection release message from the first node occurs upon a determination that a radio resource control connection between the device and a serving cell does not need to be maintained.

13. A mobile device, comprising:
a processor;
a communication subsystem communicatively coupled with the processor, the processor configured to:
access a service;
after a determination that the device is approaching an edge of coverage while the device is accessing the service,
receive, from a first node in a cellular network, a relay discovery command;
send a measurement report to the first node indicating discovered nodes capable of acting as relay nodes;
receive, from the first node, a selection of a suitable node to act as a relay node; and
receive, from the first node, an instruction to initiate a mechanism to switch to accessing the service via the relay node,
wherein the mechanism to switch to accessing the service via the relay node comprises:
the device receiving a relay mode proceed indication from the first node; and
the device receiving a connection release message from the first node.

14. The mobile device of claim 13, wherein the service is a mission critical push-to-talk over Long Term Evolution service.

15. The mobile device of claim 13, wherein the relay node is a user equipment acting as a user equipment-to-network relay node.

16. The mobile device of claim 13, wherein the measurement report comprises, for each discovered node, at least one of the following parameters:
received signal power;
quality measurements;
an L2 source address;
a battery level; or
an available processing power.

17. The mobile device of claim 13, wherein the mechanism to switch to accessing the service via the relay node comprises:
the device receiving a relay mode proceed indication from the first node;
the device sending a relay mode entered indication to the first node; and
the device receiving a connection release message from the first node upon a determination that a radio resource control connection between the device and a serving cell does not need to be maintained.

18. The mobile device of claim 13, wherein the mechanism to switch to accessing the service via the suitable relay further comprises:
   after receiving the relay mode proceed indication from the first node, the device receiving a connection release message from the first node; and wherein
   the device receiving a connection release message from the first node occurs upon a determination that a radio resource control connection between the device and a serving cell does not need to be maintained.

\* \* \* \* \*